US009213543B2

(12) United States Patent
Jain et al.

(10) Patent No.: US 9,213,543 B2
(45) Date of Patent: Dec. 15, 2015

(54) SOFTWARE INTERNATIONALIZATION ESTIMATION MODEL

(75) Inventors: Mayank Jain, Saharanpur (IN); Aviraj Singh, Navi Mumbai (IN)

(73) Assignee: Infosys Limited, Bangalore (IN)

( * ) Notice: Subject to any disclaimer, the term of this patent is extended or adjusted under 35 U.S.C. 154(b) by 17 days.

(21) Appl. No.: 13/402,767

(22) Filed: Feb. 22, 2012

(65) Prior Publication Data

US 2013/0152045 A1      Jun. 13, 2013

(30) Foreign Application Priority Data

Dec. 12, 2011   (IN) ............................ 4313/CHE/2011

(51) Int. Cl.
*G06F 9/44*        (2006.01)

(52) U.S. Cl.
CPC .. *G06F 8/76* (2013.01); *G06F 8/77* (2013.01); *G06F 9/4448* (2013.01)

(58) Field of Classification Search
CPC ............... G06F 8/20; G06F 8/40; G06F 8/70
USPC ........................................................ 717/120
See application file for complete search history.

(56) References Cited

U.S. PATENT DOCUMENTS

| | | | | |
|---|---|---|---|---|
| 5,815,654 | A * | 9/1998 | Bieda ............................ | 714/38.1 |
| 6,745,348 | B2 * | 6/2004 | Chung et al. .................. | 714/47.1 |
| 8,020,147 | B2 | 9/2011 | Chatuvedi et al. | |
| 2007/0276712 | A1 * | 11/2007 | Kolanchery et al. .............. | 705/7 |
| 2008/0092120 | A1 | 4/2008 | Udupa et al. | |

FOREIGN PATENT DOCUMENTS

JP     2005-284681     10/2005

OTHER PUBLICATIONS

"Extrapolation" (Feb. 18, 2011), Wikipedia, accessed from http://en.wikipedia.org/w/index.php?title=Extrapolation&oldid=414610279.*
"Pseudolocalization" (Jan. 25, 2011), Wikipedia, accessed from http://en.wikipedia.org/w/index.php?title=Pseudolocalization&oldid=442625796.*
"Sampling (statistics)" (Jan. 27, 2011), Wikipedia, accessed from http://en.wikipedia.org/w/index.php?title=Sampling_(statistics)&oldid=410395415.*
"Sampling frame" (Feb. 20, 2011), Wikipedia, accessed from http://en.wikipedia.org/w/index.php?title=Sampling_frame&oldid=414993139.*
"Sample size determination" (Jan. 28, 2011), Wikipedia, accessed from http://en.wikipedia.org/w/index.php?title=Sample_size_determination&oldid=410614960.*
"Statistical Population" (Oct. 29, 2010), Wikipedia, accessed from http://en.wikipedia.org/w/index.php?title=Statistical_population&oldid=393582499.*
Moran, Gretchen (Jul. 17, 2010), "Internationalization of Strings in Code", Pehtaho, accessed from http://wiki.pentaho.com/display/PEOpen/Internationalization+of+Strings+in+Code.*

(Continued)

*Primary Examiner* — Wei Zhen
*Assistant Examiner* — Andrew M Lyons
(74) *Attorney, Agent, or Firm* — Klarquist Sparkman, LLP

(57) ABSTRACT

Various technologies related to estimating programming effort to internationalize a software program are described. A sampling technique can be applied to the numerous program files that make up the software program. Stratification by impact point type can be supported. Historical data can be used to provide an accurate and reliable estimate without having to completely analyze all files in the software program

21 Claims, 15 Drawing Sheets

(56) References Cited

OTHER PUBLICATIONS

Nita, Mihai, "Internationalization Checklist," Presentation given at Silicon Valley Code Camp on Oct. 27, 2007.*
WikiVet, "Sampling Strategies," May 5, 2011, last retrieved from en.wikivet.net/Sampling_strategies on Mar. 22, 2014.*
Wikipedia, "Confidence Interval," Feb. 15, 2011, last retrieved from en.wikipedia.org/w/index.php?title=Confidence_interval&oldid=414116195 on Mar. 22, 2014.*
"A Checklist for Internationalizing an Existing Program," Feb. 1, 2001, accessed from http://www.cab.u-szeged.hu/WWW/java/tutorial/i18n/checklist/ on Oct. 4, 2014.*
"Globalization Step-by-Step: Unicode Enabled," MSDN, Mar. 1, 2003, retrieved from http://msdn.microsoft.com/enus/goglobal/bb688113.aspx on Oct. 4, 2014.*
"F Internationalization, Localization, and Unicode," Apr. 9, 2004, retrieved from http://media.datadirect.com/download/docs/sInk/admin/slunicode.html on Oct. 4, 2014.*
Braz et al., "Software Effort Estimation Based on Use Cases," COMPSAC '06, Sep. 17-21, 2006, 8 pages.
Function Point, Wikipedia, visited Nov. 16, 2011, 2 pages.
Nita, "Internationalization Checklist," Silicon Valley Code Camp, Oct. 27, 2007, 22 pages.
Mockus et al., "Understanding and Predicting Effort in Software Projects," International Conference on Software Engineering, 2003, 11 pages.
Jones, "Programming Languages Table," Software Productivity Research, Inc., Mar. 1996, 15 pages.
Sample Size Calculator, Raosoft, visited Nov. 16, 2011, 2 pages.
Sampling (statistics), Wikipedia, visited Nov. 16, 2011, 14 pages.
Screen shot of internationalization estimation tool used to generate an estimate incorporated into a proposal to a U.S. customer, Mar. 2009, 12 pages.

* cited by examiner

1300

| Interim calculations | |
|---|---|
| α | 0.05 |
| Cumulative Probability (P) | 0.975 |
| z-score (z) | 1.96 |
| Sample size for the fixed population (ss) | 384 |

| Parameter | Value |
|---|---|
| Margin of error (ME) | 5.00% |
| Confidence level (CL) | 95.00% |

| Inputs from i18n Analyzer Tool | Value |
|---|---|
| Total files containing Hard coded strings | 2000 |
| Total files containing non-Unicode APIs | 1500 |
| Total files containing non-Unicode data-types | 1700 |

| Category | Sample size |
|---|---|
| Hard-coded strings | 322 |
| non-Unicode APIs | 306 |
| non-Unicode data-types | 313 |

SOFTWARE INTERNATIONALIZATION ESTIMATION MODEL

BACKGROUND

Due to growing globalization in the software development field, there is an increasing demand to internationalize software programs. However, accurately determining the amount of programming effort needed to complete internationalization (sometimes called "i18n") of a software program can be difficult and time consuming.

For example, an analyst can estimate the amount of effort needed by reviewing the entire software program code for various conditions related to internationalization. However, typical software applications can involve a huge volume of files and myriad lines of code, making such estimation a major undertaking in itself.

Although various approaches have been taken to address such difficulties, there is still a need to address the complexities of estimating the amount of programming effort needed to complete internationalization in an efficient and accurate manner.

SUMMARY

A variety of techniques can be used for estimating the amount of programming effort needed to complete internationalization of a software program. A tool can estimate the amount of effort needed and assist in the estimation process.

Considerable efficiency and accuracy improvements in the estimation process can be realized.

Such estimates can be used to provide a formal proposal, allocate resources, and the like.

As described herein, a variety of other features and advantages can be incorporated into the technologies as desired.

The foregoing and other features and advantages will become more apparent from the following detailed description of disclosed embodiments, which proceeds with reference to the accompanying drawings.

BRIEF DESCRIPTION OF THE FIGURES

FIG. 14 is a screen shot showing an exemplary template for generating sample size in accordance with the technologies described herein.

DETAILED DESCRIPTION

EXAMPLE 1

Exemplary Overview

The technologies described herein can be used for a variety of internationalization estimation scenarios. Adoption of the technologies can provide an efficient technique for estimating the amount of programming effort needed to complete internationalization of a software program.

The technologies can be helpful to those wishing to estimate an amount of programming effort for a programming project involving internationalization of a software program. Beneficiaries include information technology solution providers, who wish to provide accurate estimates for proposals to clients, whether internal or external. Such clients can also greatly benefit from the technologies because they enjoy accurate and credible proposals targeted to their specific application.

EXAMPLE 2

Exemplary System Employing a Combination of the Technologies

Figure 1:
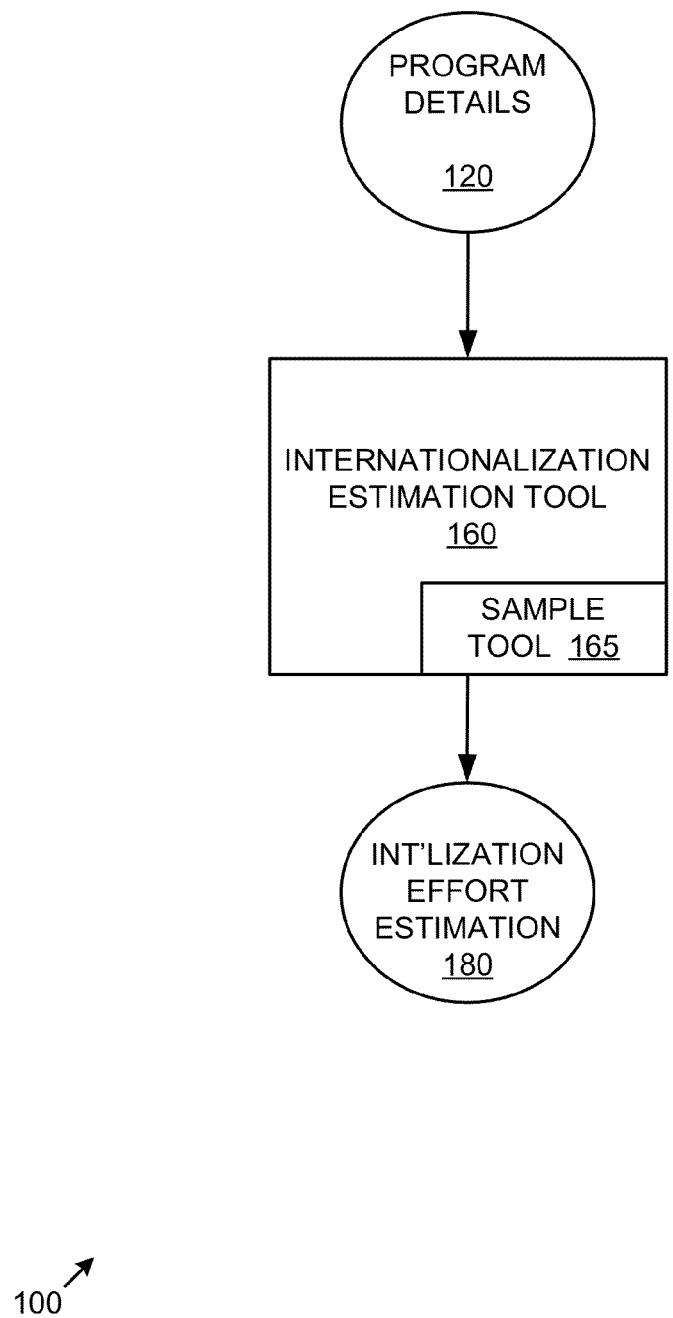
FIG. 1 is a block diagram of an exemplary system implementing the software internationalization estimation technologies described herein.

FIG. 1 is a block diagram of an exemplary system 100 implementing the software internationalization estimation technologies described herein. In the example, one or more computers in a computing environment implement internationalization estimation tool 160 that accepts as input details 120 about a software program. The tool 160 includes a sample tool 165, which assists in generation of an estimate 180 of the amount of programming effort to internationalize the software program and can include a sample size calculator.

The tool 160 can be included as part of another internationalization analysis tool or be used in conjunction with such a tool (e.g., to analyze software programs from an internationalization perspective).

In practice, the systems shown herein, such as system 100 can be more complicated, with additional functionality, more complex inputs, and the like.

As described herein, the tool 160 can handle a plurality of internationalization impact point types, and the sample tool 165 can be utilized accordingly.

In any of the examples herein, the inputs, outputs, and tools can be stored in one or more computer-readable storage media or computer-readable storage devices.

EXAMPLE 3

Exemplary Method of Applying a Combination of the Technologies

Figure 2:
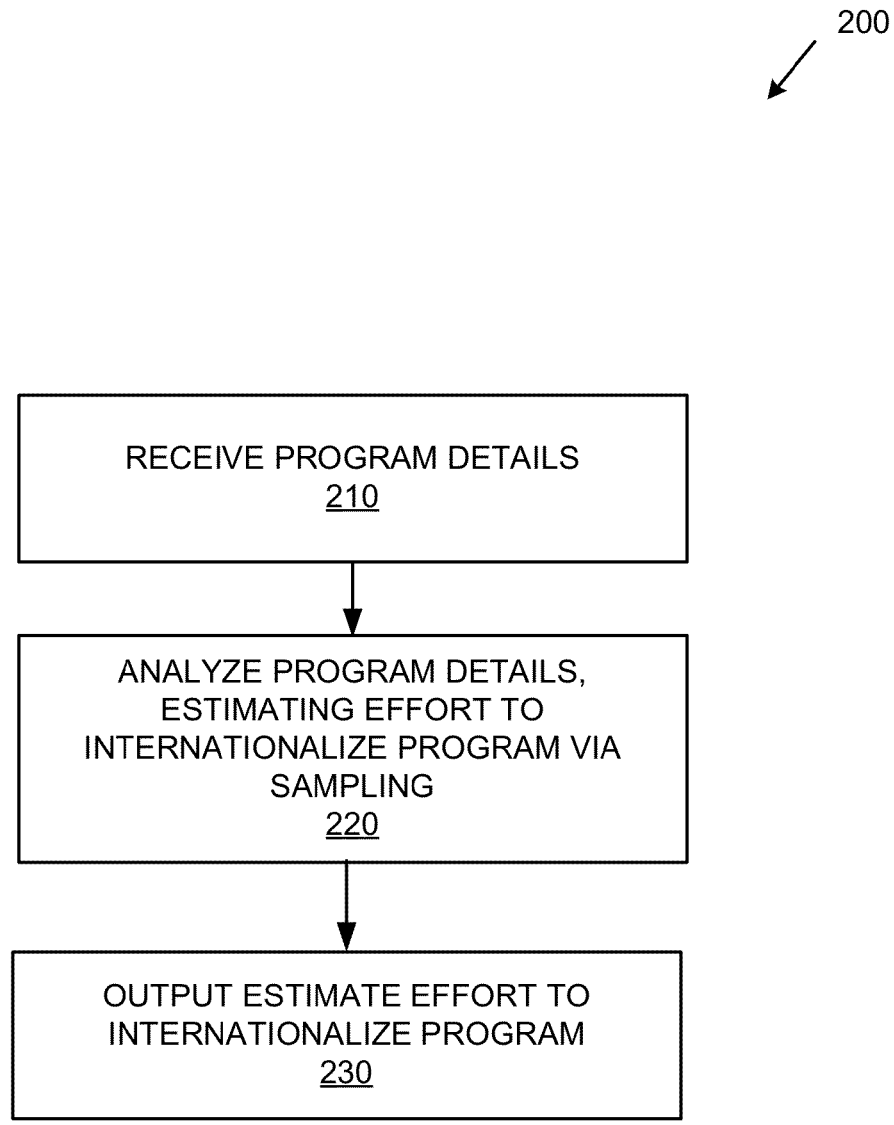
FIG. 2 is a flowchart of an exemplary method of implementing the software internationalization estimation technologies described herein.

FIG. 2 is a flowchart of an exemplary method 200 of implementing the internationalization estimation technologies described herein and can be implemented, for example, in a system such as that shown in FIG. 1. The technologies described herein can be generic to the specifics of operating systems or hardware and can be applied in any variety of environments to take advantage of the described features.

At 210, details of a software program are received. Such details can include the number of files, the content of the files, which files have internationalization impact points, and the like, as described herein.

At 220, the program details are analyzed to estimate the programming effort to internationalize the program. As described herein, a sampling technique can be employed.

Such a sampling technique can comprise calculating a sample size, using a confidence interval and a confidence level, and the like.

At 230, an estimate of the programming effort to internationalize the program is output.

The method 200 and any of the methods described herein can be performed by computer-executable instructions stored in one or more computer-readable media (e.g., storage or other tangible media) or stored in one or more computer-readable storage devices.

EXAMPLE 4

Exemplary Programming Effort

In any of the examples herein, programming effort can be estimated in any of a variety of metrics. For example, function points, lines of code, hours (e.g., worker hours), and the like can be used.

In practice, the programming effort can then be converted into a monetary (e.g., dollar, euro, or the like) measure and included as part of a proposal that involves internationalizing the software program.

Because the estimated programming effort is an estimate, it can be provided as a range (e.g., within two values) according to a confidence interval. The range can be used as desired. For example, a conservative practice may be to use the higher end of the range to avoid underestimating the amount of programming effort.

EXAMPLE 5

Exemplary System Calculating Estimate

Figure 3:
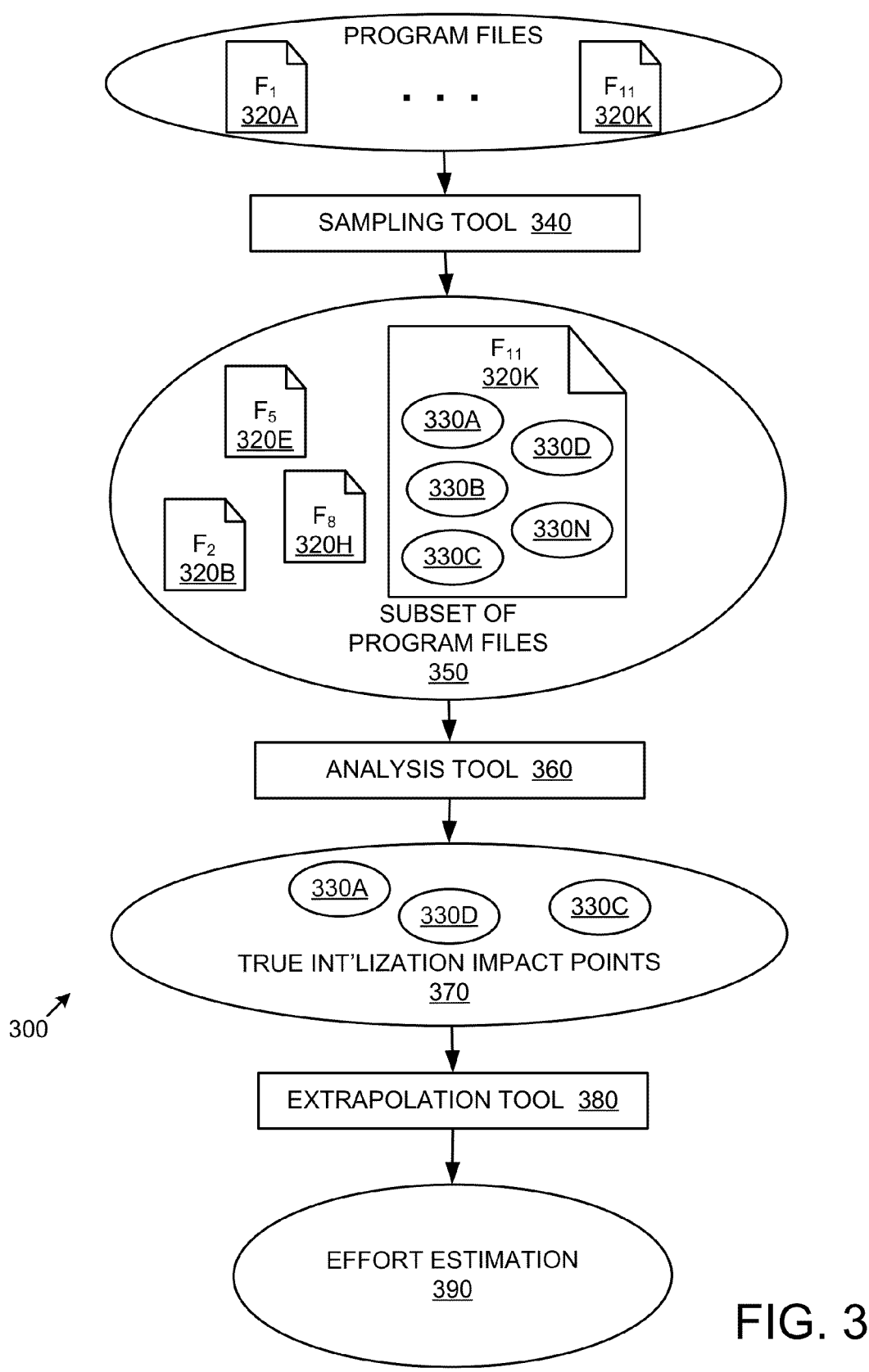
FIG. 3 is a block diagram of an exemplary system determining an estimate for internationalization.

FIG. 3 is a block diagram of an exemplary system 300 determining an estimate for internationalization. One or more of the various tools 340, 360, and 380 can be combined into an overall internationalization estimation tool. One or more of the tools (e.g., the analysis tool 360) can be external to the overall tool or be provided from another source.

Inputs to the sampling tool 340 can include the software program files 320 of a software program that is to be internationalized (e.g., for which an estimate of the amount of programming effort required to internationalize is desired). The program files 320 can be the overall program files, a sampling frame, or strata (e.g., stratified by impact point type) as described herein.

In the example, the sampling tool 340 can output a subset 350 of the program files 320A-K. In practice, a reference or count of program files can be indicated rather than outputting the text of the program files 320A-K. A program file 320K can have one or more candidate internationalization impact points 330A-N.

As part of the sampling process, the sampling tool 340 can be configured to receive a count of the overall program files having candidate internationalization impact points and calculate, based on a confidence interval and a confidence level, a sample size indicating size of a subset of the overall program files to be taken from the program files.

An analysis tool 360 can be used to determine (e.g., for respective of the subset of program files 350) which of the candidate internationalization impact points 330A-N are true internationalization impact points 370.

An extrapolation tool 380 can take information, including that from the sampling process, as input and output an estimated amount of programming effort 390 to internationalize the software program. The extrapolation tool 380 can be configured to receive a number of candidate impact points for the subset of the program files, a number of true impact points for the subset, and a number of candidate impact points for the overall program files having candidate internationalization impact points and calculate, based on historical programming efficiency data, an estimated number of hours to complete internationalization of the software program.

As described herein, a variety of features can facilitate accurate and efficient determination of an internationalization estimate.

EXAMPLE 6

Exemplary Method of Determining Internationalization Estimate

Figure 4:
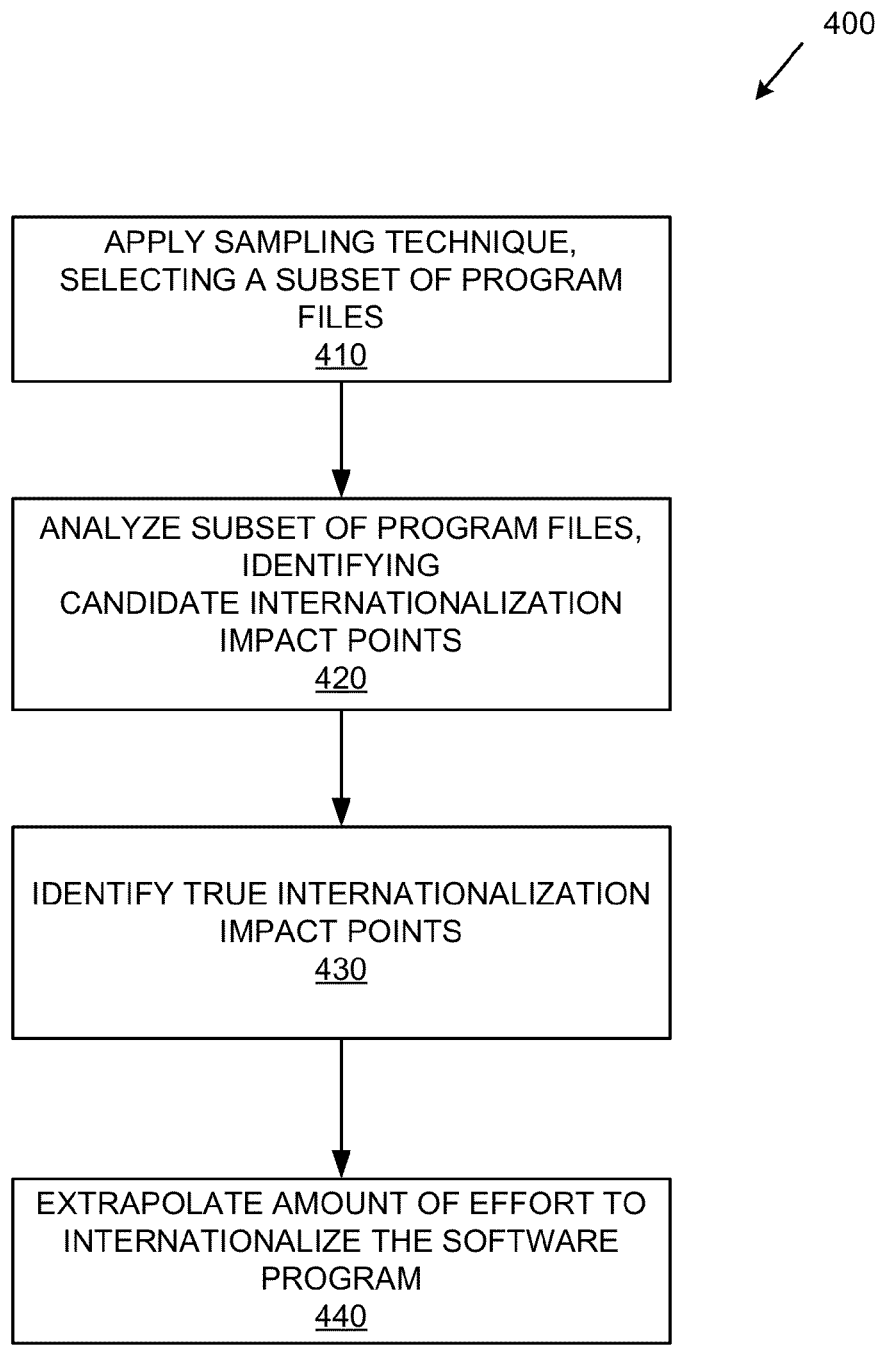
FIG. 4 is a flowchart of an exemplary method of determining an estimate for internationalization.

FIG. 4 is a flowchart of an exemplary method 400 of determining an estimate for internationalization and can be implemented, for example, in a system such as that shown in FIG. 3.

At 410, for a software program comprising an overall plurality of program files, a sampling technique is applied to the program files, selecting a subset (e.g., sample) of the program files out of the overall plurality of program files (e.g., a sampling frame of files containing one or more candidate internationalization impact points). Such a sampling technique can involve determining the files involved and counting them (e.g., to determine a number of the program files). As part of the process, the files themselves may be received.

At 420, the subset of program files are analyzed, identifying candidate internationalization impact points (e.g., determining that a certain number of candidate internationalization impact points appear in the subset of program files). In practice, an analysis tool can be used or manual analysis of code can be performed. A count of the number of candidate internationalization impact points can be generated (e.g., per program file).

In practice, candidate internationalization impact points can also be identified for the other files (e.g., the program files other than those in the subset chosen by sampling); such identification can be performed at the same time the subset is analyzed, or at some other time.

At 430, the true internationalization impact points out of candidate internationalization impact points in the subset of program files are identified. For example, a number of the candidate internationalization impact points that are true internationalization impact points can be identified (e.g., a count is determined). Various conditions as described herein can be detected to indicate that a candidate internationalization impact point need not be addressed as part of the internationalization process; such an impact point is not a true internationalization impact point. The identification can be performed per file. Results can be stored separately per file or combined as described herein.

At 440, the amount of programming effort to internationalize the software program is extrapolated. Such extrapolation can be based on the number of candidate internationalization impact points and the number of true internationalization impact points. The extrapolation indicates an estimate of the overall effort needed to internationalize the software program, for the overall files. In practice, extrapolation can extrapolate an estimated number of true internationalization impact points for the overall plurality of program files. As noted herein, extrapolation can calculate an estimated amount of worker hours to internationalize the program (e.g., based on estimated number of true internationalization impact points and historical data indicating programmer productivity). As described herein, certain files (e.g., not having candidate internationalization impact points) can be excluded from processing.

As described herein, a sampling technique can specify a confidence interval and confidence level. In such a case, the amount of programming effort can take the form of an estimate and can be given as a range or a particular number in a variety of units (e.g., function points, time units, or the like).

EXAMPLE 7

Exemplary Software Programs

In any of the examples herein, a software program can be any of a variety of software programs or applications, whether web-based, desktop, cloud-enabled, or the like. The technologies described herein can support software programs in a variety of programming languages, the details of which are independent of the principles of operation.

As described herein, such programs can comprise a plurality of program files. Such files can include executable code, whether in the form of source code, scripts, or the like.

EXAMPLE 8

Exemplary Sampling Technique

In any of the examples herein, a variety of sampling techniques can be applied, resulting in a selected subset of program files. Sampling techniques can include calculating a sample size using a z-score corresponding to a confidence level.

Having determined a sample size, a variety of sampling techniques can be used to select the sample from the source population. For example, systematic sampling can be used. In such a technique, the population can be ordered (e.g., by number of occurrences of candidate impact points), and a subset of the program files can be selected by choosing files at regular intervals (e.g., starting at some random file, every subsequent nth file is selected in the sample, where n=(population size/sample size). In practice, the starting element is not the first in the list, but chosen randomly between the first and nth element.

Stratification can be applied as described herein, leading to different sample sizes, and thus different samples, for different internationalization impact point types.

EXAMPLE 9

Exemplary Sample Size Calculator

In practice, a separate tool for calculating sample size can be provided for use by those engaged in effort estimation. Taking inputs as described herein, the sample size calculator can generate a recommended sample size that will support a given confidence interval and confidence level.

EXAMPLE 10

Exemplary Internationalization Impact Points

In any of the examples herein, internationalization impact points can be any of a variety of conditions detected in software program files that require remediation to internationalize the program.

For example, for a software program that has not been internationalized, a hard-coded text string may be of a particular human language (e.g., French, English, or the like). If the string is displayed to a user, internationalization requires that the string be externalized so that any of a variety of strings in any of a variety of human languages can be used, depending on what language is selected for the program (e.g., during installation, in preferences selected by a user, etc.). Thus, remediation may require substituting different program code that refers to an external string rather than the hard-coded string, or some other technique.

Other types of internationalization impact points include occurrences of non-Unicode application program interfaces (e.g., including invocations thereof), occurrences of non-Unicode data types (e.g., including usages thereof).

Still other types of internationalization impact points include date/time fields, number formatting, and the like.

EXAMPLE 11

Exemplary Candidate Internationalization Impact Points

In any of the examples herein, candidate internationalization impact points can be conditions detected in software program files that are suspected to be (e.g., tend to indicate) internationalization impact points.

A true internationalization impact point is one that indeed needs to be addressed during internationalization. An example is a hard-coded string that needs to be externalized (e.g., stored outside the program file or outside the source code) to achieve internationalization.

The effort to verify that a candidate internationalization impact point is a true impact point is typically greater than simply identifying the candidate in the first place. For example, in the case of hard-coded strings, some strings may not be visible to a user, may only be used in debugging logs, or the like. In such a case, while the string could be externalized, in practice it is typically not required per internationalization requirements. Accordingly, including such impact points in an estimate overestimates the amount of work required. Such a candidate is sometimes called a "false positive."

In some software programs, the number of false-positive candidate internationalization impact points can number in the thousands, which would lead to great overestimation of the amount of effort to internationalize the software program.

EXAMPLE 12

Exemplary Identification of True Internationalization Impact Points

In any of the examples herein, candidate internationalization impact points can be identified as true internationalization impact points. Such identification can be accomplished via a tool. Or, the determination can be done manually, with the identification supplied for use by a tool.

For example, in the case of hard-coded strings or other impact point types, a tool can scan source code to determine that the hard-coded string or other item is never displayed to (e.g., not visible to) a user of the software program or is otherwise not relevant from an internationalization perspective. One such situation involves output to a debug log file (e.g., debug log messages), in which case the candidate internationalization impact point can be designated as not being true.

In practice, techniques can designate candidate impact points as true or not true, depending on detected conditions (e.g., display to a user, write to a log, internal program use, etc.). Those remaining can be considered true, not true, or unknown, depending on configuration of the tool.

EXAMPLE 13

Exemplary Number of Files

In any of the examples herein, a number of files can be indicated by a count of the files. For example, "1534" can indicate that there are 1534 program files having a particular condition (e.g., they are candidate internationalization impact points, true impact points, or the like).

EXAMPLE 14

Exemplary Labor Rates

In any of the examples herein, labor rates can indicate an amount paid for a unit of labor (e.g., hourly labor rate, monthly labor rate, or the like).

EXAMPLE 15

Exemplary Stratification

In any of the examples described herein, stratification can be used to separately apply the described sampling techniques and extrapolation for different internationalization impact point types (e.g., different strata are used in place of the overall program files and/or subsets thereof). The results can be summed together to arrive at a total amount of effort required to internationalize the program.

EXAMPLE 16

Exemplary Omission of Files Having No Impact Points

In any of the examples herein, it may be detected that some program files may have no candidate internationalization impact points. In such a case, processing for the files can be omitted (e.g., from estimation calculations) after such a determination is made. If stratification is supported, processing for files having no candidate impact points for a particular impact point type can be omitted (e.g., from estimation calculations) for the particular impact point type after such a determination is made.

In this way, a differentiation between a population (e.g., the total number of files present in the program code) and a sampling frame can be achieved. The sampling frame can be those program files having one or more candidate internationalization impact points. The sampling frame can be used as input for any of the sampling processes described herein.

For example, when determining percentages, applying percentages, or the like, processing for programming files having no internationalization impact points can ignore the files.

EXAMPLE 17

Exemplary System Implementing Sampling of Program Files

Figure 5:
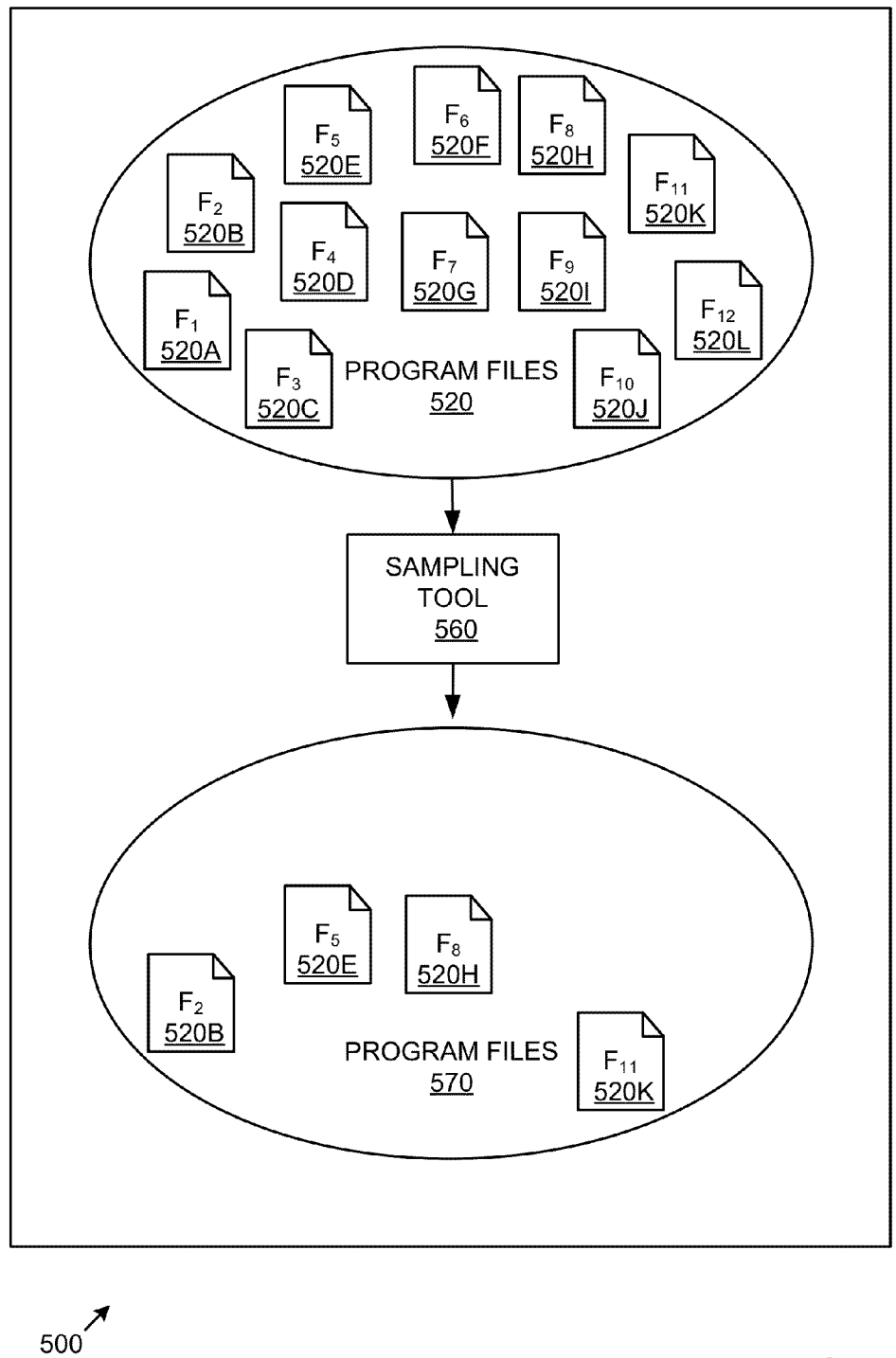
FIG. 5 is a block diagram of an exemplary system implementing sampling of program files for internationalization estimation.

FIG. 5 is a block diagram of an exemplary system 500 implementing sampling of program files for internationalization estimation and can be implemented in any of the examples herein. In the example, the sampling tool 560 is used to generate a subset (e.g., sample) 570 of program files 520A-L, based on an input of the program files 520 (e.g., overall program files of software program code, a sampling frame, or the like). In practice the program files 520 themselves may not be needed, if sufficient other information (e.g., the number of program files 520, which of them have candidate internationalization impact points, and the like) is available.

The tool 560 can provide a rich set of features for sampling the program files 520. For example, a user can specify a sampling technique, whether to stratify as described herein, and the like.

EXAMPLE 18

Exemplary Method of Sampling Program Files

Figure 6:
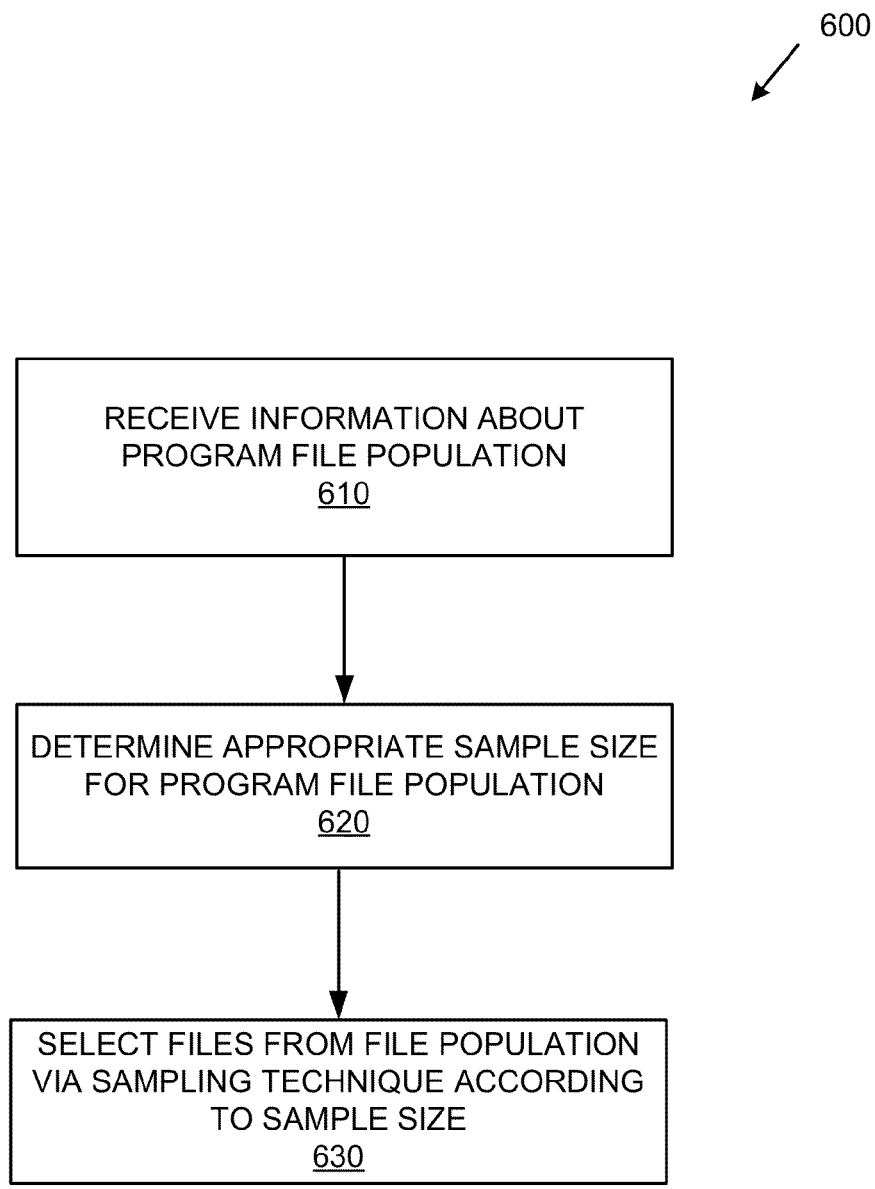
FIG. 6 is a flowchart of an exemplary method of implementing sampling of program files for internationalization estimation.

FIG. 6 is a flowchart of an exemplary method 600 of implementing sampling of program files for internationalization estimation and can be implemented, for example, in a system such as that shown in FIG. 5.

At 610, information about a program file population is received. For example, the number (e.g., a count) of program files having at least one candidate internationalization impact point can be received (e.g., after being counted).

At 620, an appropriate sample size for the program file population is determined. Such a determination can be based on the number of program files containing at least one candidate internationalization impact point. As described herein, a confidence interval and a confidence level can be used during the determination.

At 630, files (e.g., a subset of the program files) from the file population (e.g., having at least one candidate internationalization impact point) are selected via a sampling technique according to sample size. Any number of sampling techniques can be used, including systematic sampling as described herein.

EXAMPLE 19

Exemplary Stratification by Impact Point Type

Figure 7:
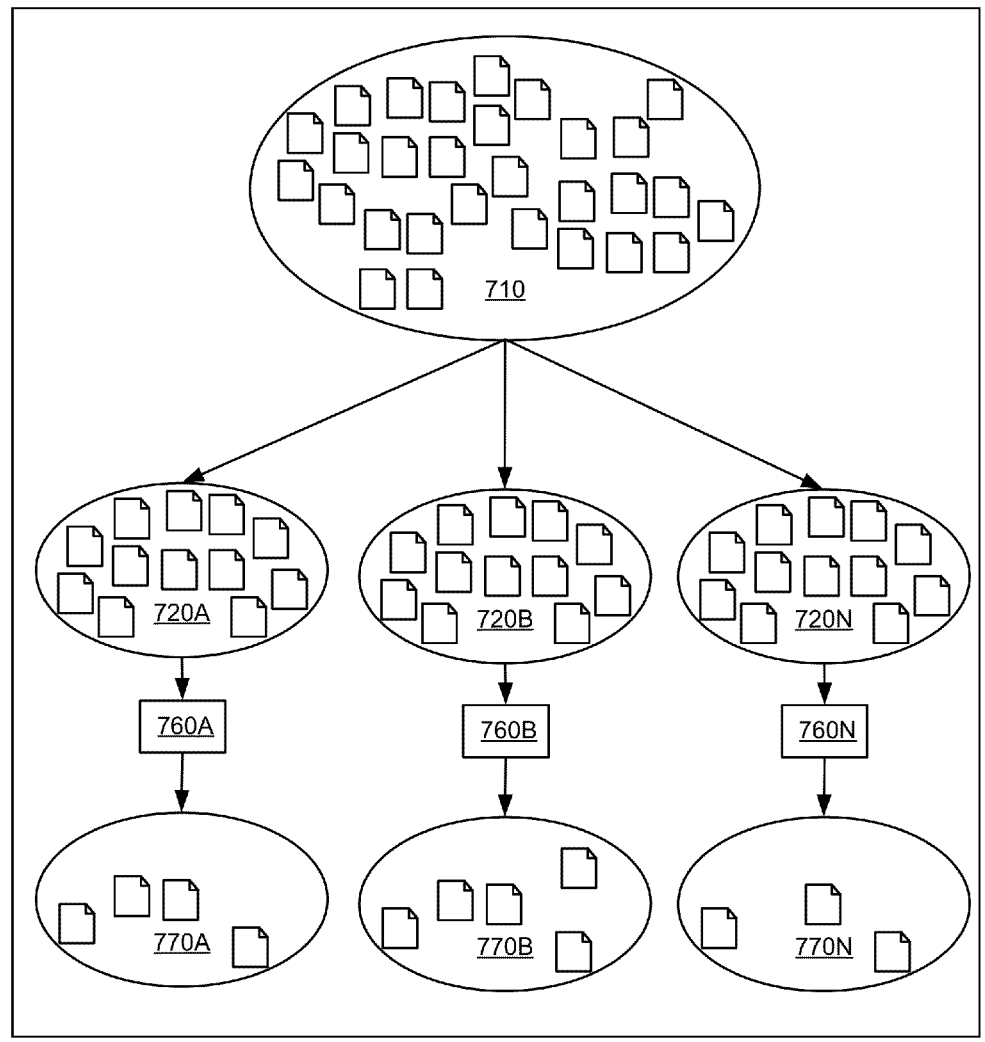
FIG. 7 is a block diagram of an exemplary system implementing stratification by internationalization impact point type.

FIG. 7 is a block diagram of an exemplary system 700 implementing stratification by internationalization impact point type. In the example, an overall population 710 of program files is stratified into separate populations 720A-N based on internationalization impact point types (e.g., hard-coded strings, occurrences of non-Unicode application program interfaces, occurrences of non-Unicode data types, or the like as described herein). A sampling tool 760A-N can accept the separate populations 720-N as inputs and output respective subsets 770A-N of program files. The subsets 770A-N can then be used for further analysis as described herein (e.g., to determine true internationalization impact points) to facilitate an estimation of effort for internationalization.

EXAMPLE 20

Exemplary Method for Stratification by Impact Point Type

Figure 8:
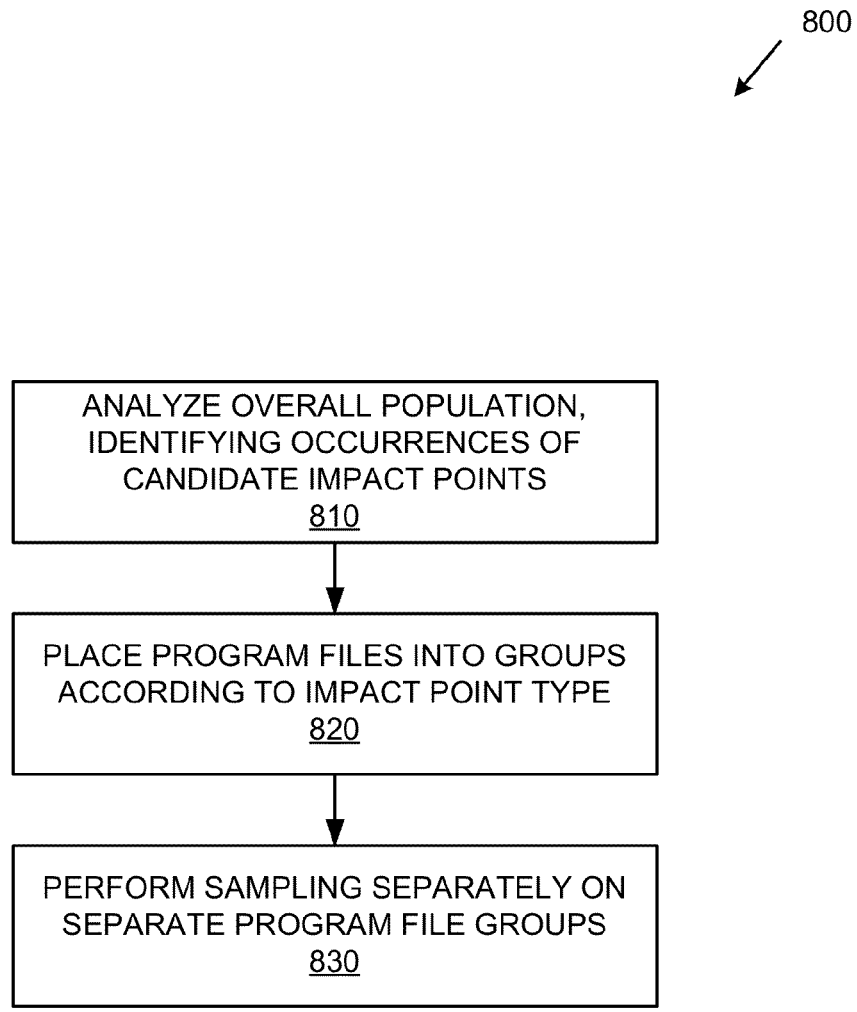
FIG. 8 is a flowchart of an exemplary method of implementing stratification by internationalization impact point type.

FIG. 8 is a flowchart of an exemplary method 800 of implementing stratification by internationalization impact point type.

At 810, the overall population of program files of a software program are analyzed to identify occurrences of various types of internationalization impact points. For example, for the different internationalization impact point types, a respective number of program files having candidate internationalization impact points of the internationalization impact point type can be counted.

At 820, the program files are placed into groups (e.g., strata) according to the internationalization impact point type (e.g., detected in the program files). The groups may overlap (e.g., a program file can belong to more than one group). The respective number of program files having candidate internationalization impact points of the impact point types can be counted.

At 830, sampling is performed separately on the separate program file groups. For example, as described herein, different sample sizes can be calculated for the different internationalization impact point types (e.g., strata).

Further analysis can be performed on the resulting subsets as described herein.

EXAMPLE 21

Exemplary System Extrapolating Effort

Figure 9:
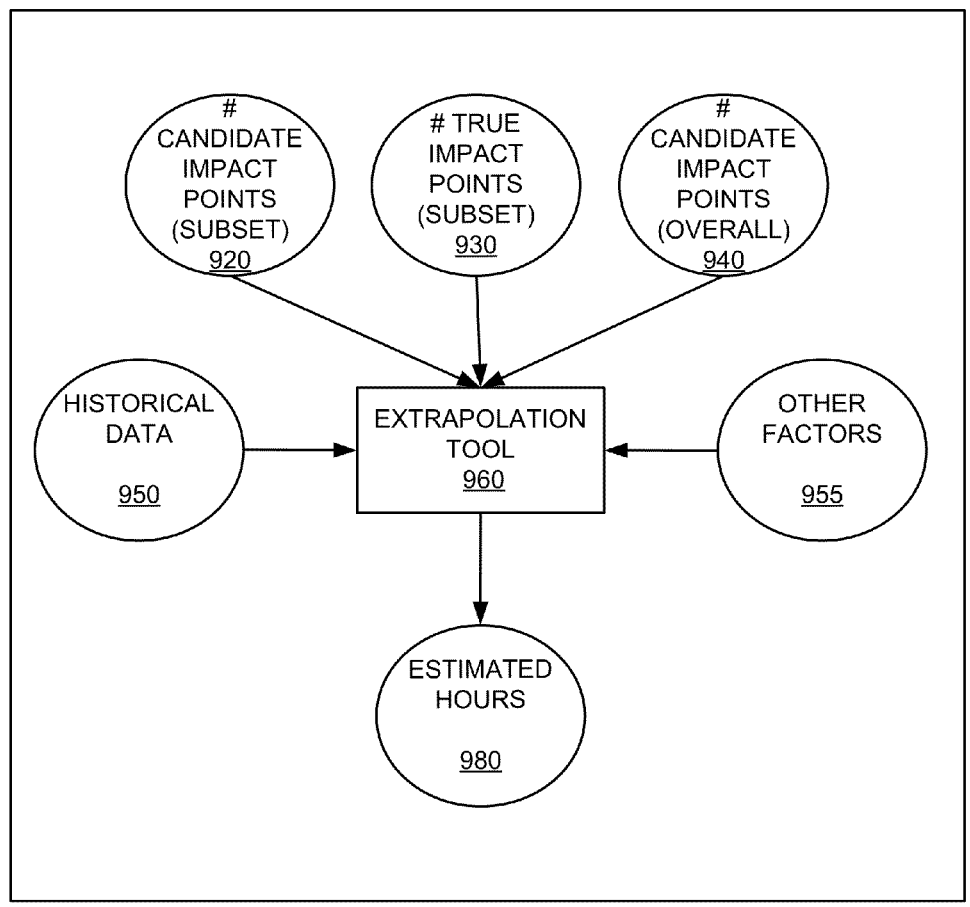
FIG. 9 is a block diagram of an exemplary system implementing extrapolation.

FIG. 9 is a block diagram of an exemplary system 900 extrapolating effort to internationalize a software program and can be used in any of the examples herein. In the example, inputs include a number 920 of candidate impact points (e.g., in a subset of program files determined via the sampling techniques described herein), a number 930 of true impact points (e.g., in the subset), a number 940 of candidate impact points in an overall set of program files, historical data 950 (e.g., of programmer efficiency), and other factors 955 (e.g., a language involved or the like).

The number 940 of candidate impact points in the overall set of program files can be for the program files of the software program, for the program files other than those in the subset, or for the program files having candidate impact points, other than those in the subset.

An output can be estimated hours 980.

In practice, the tool 960 can operate in stages. For example, the output can be a number other than hours, which is converted into hours (e.g., via the historical data 950 and the other factors 955).

EXAMPLE 22

Exemplary Method of Extrapolation Effort

Figure 10:
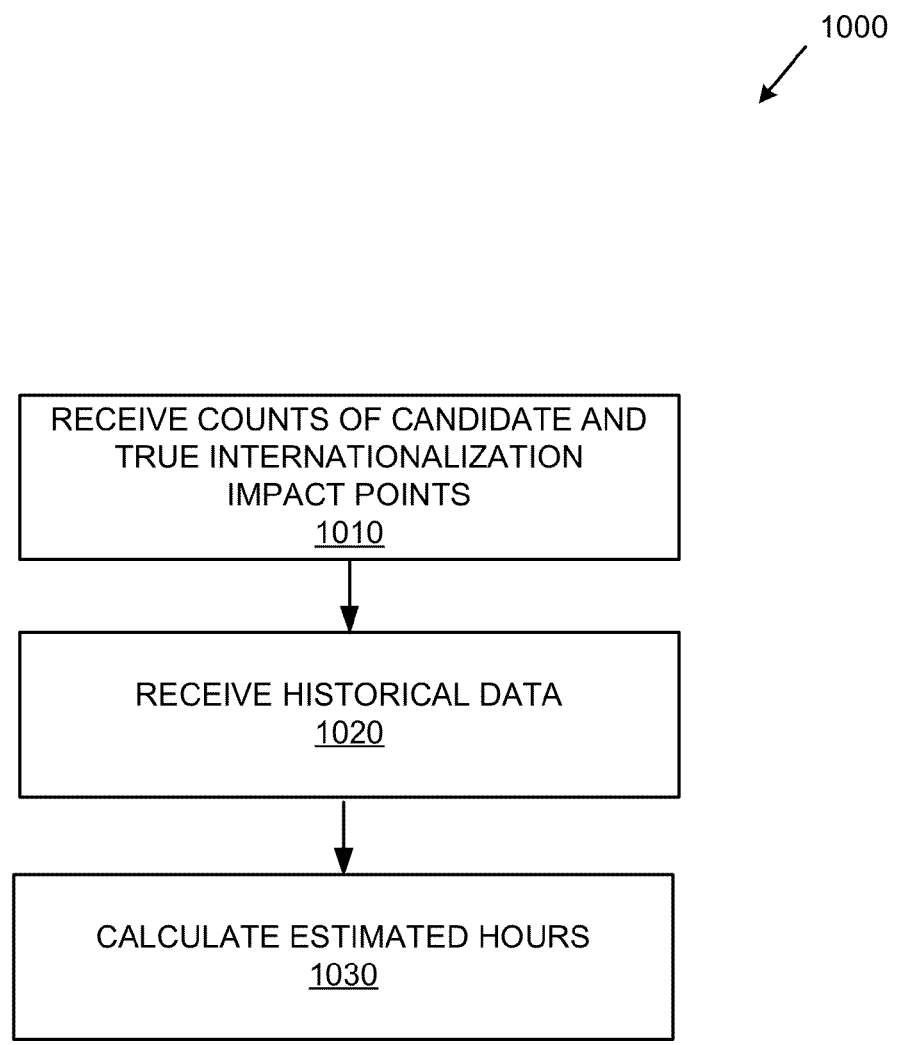
FIG. 10 is a flowchart of an exemplary method of implementing extrapolation.

FIG. 10 is a flowchart of an exemplary method 1000 of implementing extrapolation and can be implemented, for example, in a system such as that shown in FIG. 9.

At 1010, a count of candidate internationalization impact points and a count of true internationalization impact points are received. The count of candidate internationalization impact points can be divided into those for the subset (e.g., sample) of program files and those for the other files (or those for the overall program files).

At 1020, historical data is received. Such historical data can include that from the organization that will be implementing the internationalization of the software program. For example, such organizations typically keep or have access to historical data showing programmer productivity (e.g., number of source lines of code (SLOC) produced per hour, or the like).

At 1030, an estimated number of hours to internationalize the program can be calculated. Extrapolation can use the sampled program files to determine an observed rate of true impact points and extrapolate under the assumption that the observed rate will also be the rate for the other (e.g., non-sampled) files. The estimated number of hours can be a range based on a confidence interval (e.g., the confidence interval used during sample size calculation). As described herein, stratification can be used for different internationalization impact point types.

Any of the inputs shown in FIG. 9 can be used.

EXAMPLE 23

Exemplary System Extrapolating for Unsampled Files

Figure 11:
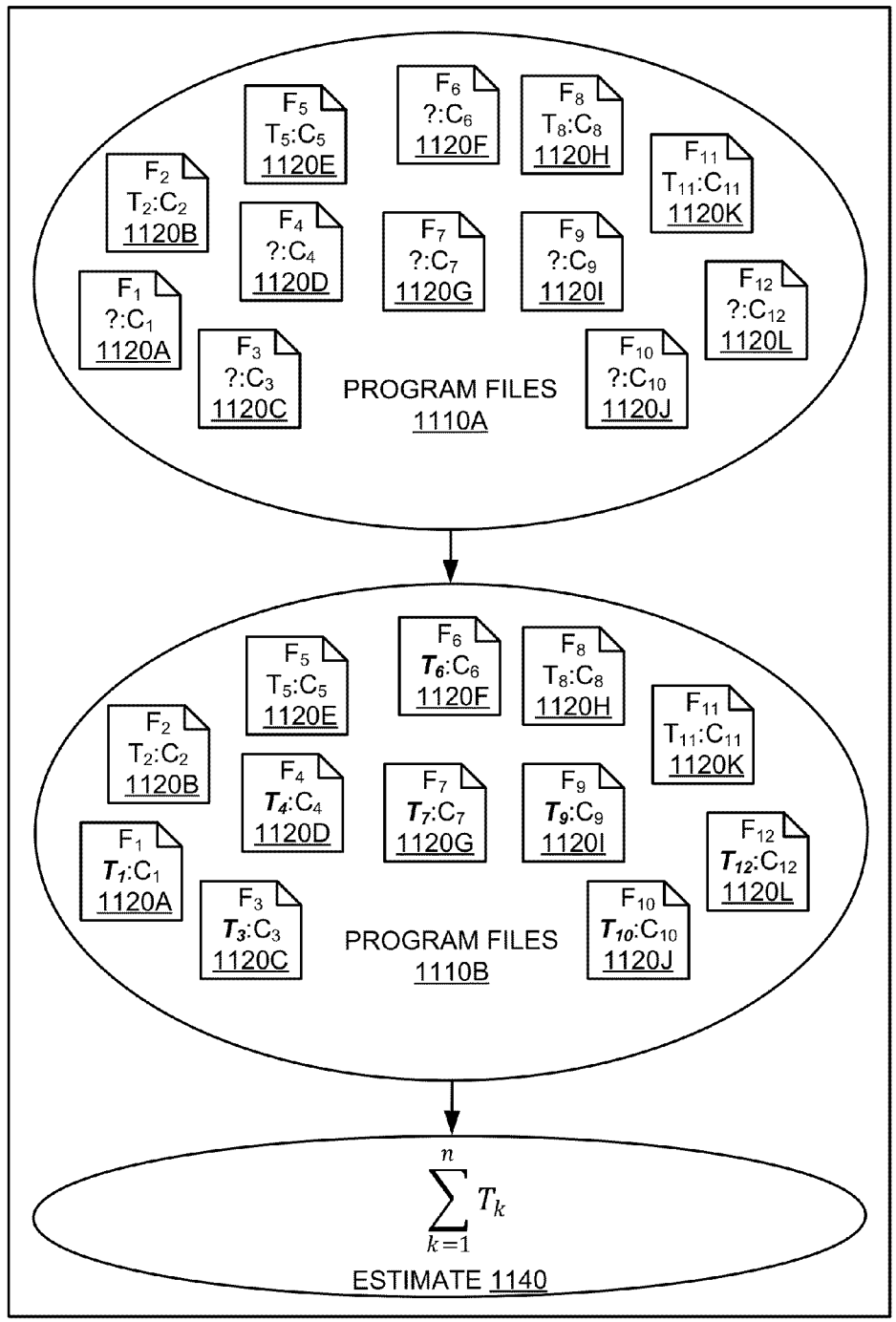
FIG. 11 is a block diagram of an exemplary system implementing extrapolation for unsampled program files.

FIG. 11 is a block diagram of an exemplary system 1100 implementing extrapolation for unsampled program files 1120A,C,D,F,G,I,J, L. In the example, the number of candidate internationalization impact points is known for each of the files 1120A-L. A sampling technique as described herein has been implemented to select a subset 1120B, E, H, K of program files. The number of true internationalization impact points for the subset of program files is determined and shown as known (e.g., having a certain number). So, at 1110A, the number of true internationalization impact points for the other files is not known.

In any of the examples herein, extrapolation (e.g., determining a percentage for the sampled files and applying it to the unsampled files) can be used to calculate an estimate for the unsampled files. So, at 1110B, the number of true internationalization impact points is shown as estimated (e.g., in italics).

An observed percentage of true internationalization impact points for the subset of program files can be applied to a number of candidate internationalization impact points in other program files out of the overall plurality of program files.

An overall estimated number 1140 of true internationalization impact points can then be calculated as the sum of the observed true internationalization impact points and the extrapolated internationalization impact points.

EXAMPLE 24

Exemplary Method of Extrapolating for Unsampled Program Files

Figure 12:
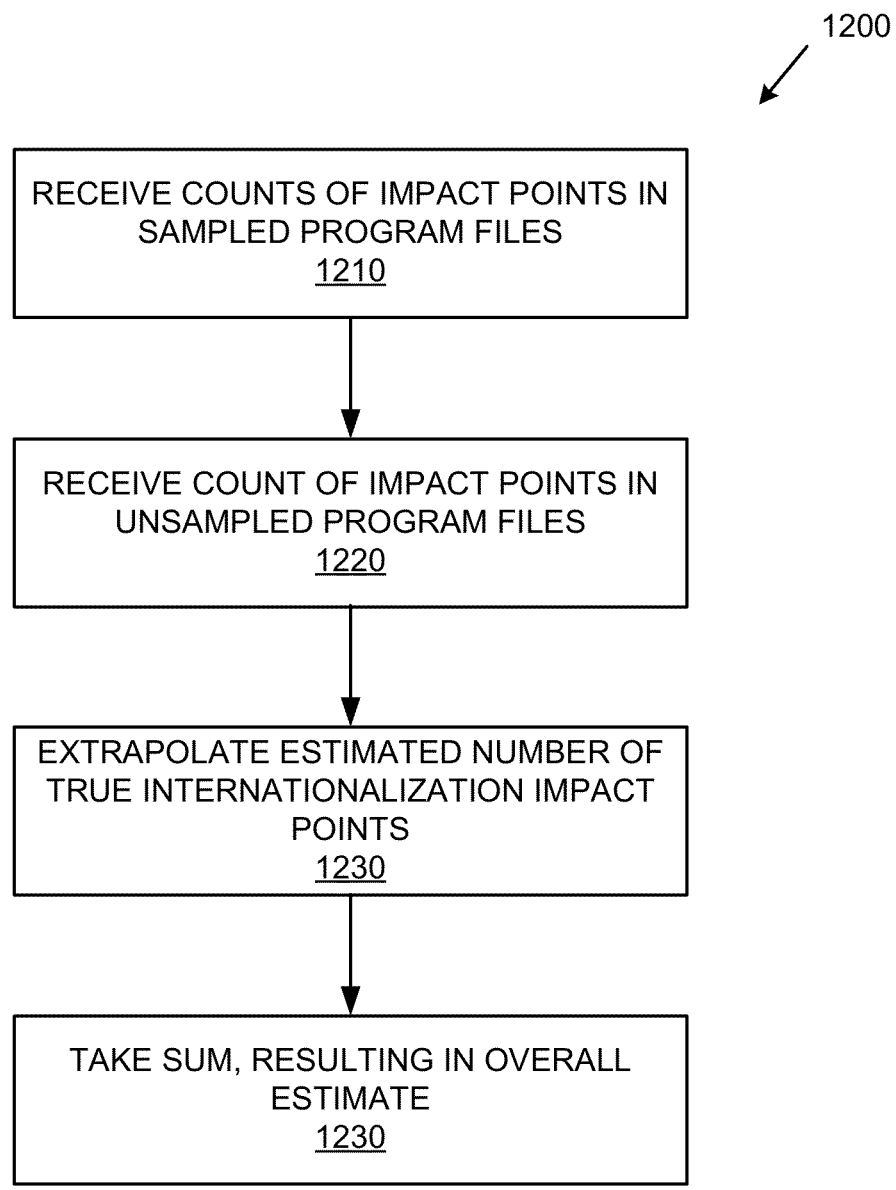
FIG. 12 is a flowchart of an exemplary method of extrapolating for unsampled program files.

FIG. 12 is a flowchart of an exemplary method 1200 of extrapolating for unsampled program files making up a software program and can be used, for example, in a system such as that shown in FIG. 11.

At 1210, for sampled program files, a number of observed true internationalization impact points and a number of candidate internationalization impact points is received. Such a number can also be received as a percentage, or used to calculate a percentage.

At 1220, a number of candidate internationalization impact points is received for unsampled program files.

At 1230, extrapolation is used to calculate an estimated number of true internationalization impact points for the unsampled program files (e.g., by multiplying a percentage and the number of candidate internationalization impact points). Such extrapolation can be done on a file-by-file basis or for the files together.

At 1240, a sum of the observed true and estimated true internationalization impact points is taken, resulting in an estimate of the overall effort to internationalize the software program.

EXAMPLE 25

Exemplary Analysis Tool

In any of the examples herein, an internationalization analysis tool can evaluate whether a candidate internationalization impact point is a true internationalization impact point and provide results of the evaluation. Evaluation can be done using a static approach (e.g., without executing the code). Examples include detecting that a hard-coded string is used in a debug log, or the like as described herein.

EXAMPLE 26

Exemplary Additional Details for Implementation (SIEM)

Figure 13:
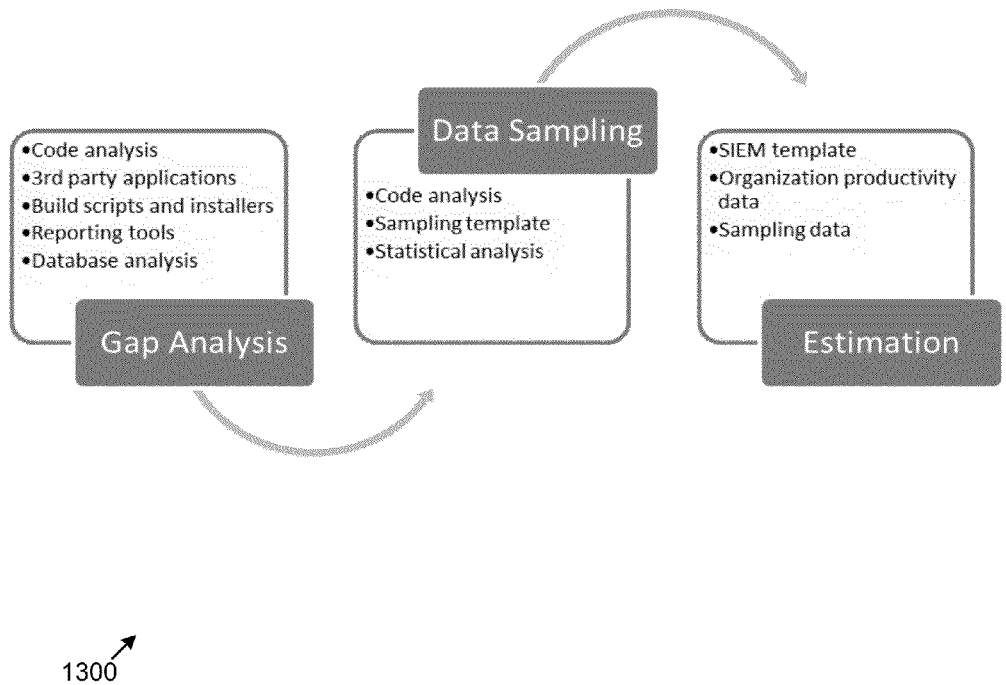
FIG. 13 is a block diagram showing exemplary tasks involved in a software internationalization estimation model.

The technologies described herein can be implemented in a Software Internationalization Estimation Model (SIEM), which is aimed at providing effort estimation for internationalizing an existing application/product by taking into account the internationalization impact points at a very granular level (e.g., the input data is collected by doing a static analysis of the code to get the number of hard-coded strings, non-Unicode functions, variables etc.). The quantitative data combined with other qualitative data such as internationalization support for installers, build scripts, etc.) can be used to arrive at a reasonably accurate internationalization effort estimate.
Approach FIG. 13 is a block diagram showing exemplary tasks involved in a software internationalization estimation model (SIEM). The SIEM can include a systematic approach for Gap Analysis, data sampling, and estimation to assess the amount of effort needed for internationalization of an existing application/product.
GAP Analysis SIEM can include an approach for carrying out the internationalization gap analysis in an existing application (e.g., based in Java, C, C++, or the like). Analysis is done based on the level of Internationalization desired (e.g., string externalization, number formatting, message formatting, etc.). Some of the requirements also vary from region to region (e.g., bi-directional text support for mid-eastern countries). Apart from such requirements, the impact of which can be measured by static code analysis, gap analysis can also take into account one or more of the following areas which impact the internationalization of applications:

Analysis of $3^{rd}$ party tools and APIs
Installers and build scripts
DB schema changes
Reporting tools interfacing with the application
Gap analysis can list down all areas within and outside the application which can impact the internationalization of the application.
Code Analysis Code analysis can be carried out during gap analysis. Code analysis can be done manually and also with the help of static code analysis tools. For large applications, a combination of both automated code analysis and manual analysis may be used. The code analysis can:

Identify the Gaps with respect to internationalization features, i.e. find the areas in the code which have to be modified in order to internationalize the application.
Assess the level of internationalization specific features already implemented in the code.

For large applications, with a huge code base, it may not be possible to manually analyze each and every file. Tools to perform static code analysis can be used to provide a high level assessment of the code, which can be followed by data sampling as described herein and manual analysis.

Code analysis, using static analysis tools, can give a raw output of the internationalization impact points in the code (e.g., candidate impact points). It is quite possible that not all reported impact points need to be modified for internationalization since it is also important to analyze the scenario in which they are being used. In order to further refine the output of the static analysis tools, a manual code analysis can be used. If the files to be manually analyzed are too many in number, a sampling approach can be followed.

Analysis of $3^{rd}$ Party Tools and APIs

A list of $3^{rd}$ party tools and APIs can be compiled and they can be analyzed for internationalization support. If the $3^{rd}$ party tools do not provide internationalization support in the current version, support can be check to see if it is available in later versions. Modifications to $3^{rd}$ party tools and APIs can be checked to see if they come under the scope of the internationalization exercise.

Analysis of Build Scripts and Installers

The application build script can be analyzed to check if it can support builds for different locales. Changes to build scripts might be required in order to create executables or jars which support multiple locales.

If the application uses an installer to get installed, it can be checked if the Installer software itself supports Unicode. The customer might have the following requirements related to installations:

The installer should allow the user to choose the language in which the installation should be done.
The installer should install the application for all available languages supported by the application design.
The installer should install the application in the user's chosen language.

Analysis of DB Schema

If the application uses a database, the database schema can be analyzed to check the following:
If any table contains Unicode data
If any collation is set on the database Encoding support Analysis of Reporting Tools If the application uses reporting tools like Crystal Reports, Cognos Reports, etc., they can be analyzed to check the following:

Unicode support available in these tools

Number of report templates used in the application. This will give an idea of the amount of work required to internationalize the reports Data Sampling The internationalization estimation model can work on quantitative data obtained by static code analysis. For example, the following data can be obtained by doing a static code analysis using a developed internationalization analysis tool:

Count of hard coded strings in the code

Count of non-Unicode APIs and data types in the code

Count of instances where date formatting is being done

Count of instances where number formatting is being done

Others as desired

Based on certain pre-defined internationalization rules for a particular language, the internationalization analysis tool can get the number of instances which match the criteria. Because some tools are not imbued with the intelligence to understand the correctness of context of use of detected instances, all of such instances may not require to be changed for internationalization compatibility. A sampling approach can then be defined to filter the results to arrive at the number of instances that need actual changes. With these numbers an extrapolation can be done to estimate the percentage of detected instances which actually need changes. The numbers obtained here are then used in the estimation model to calculate the effort.

For example, an internationalization analysis tool may detect a total of 50,000 hard-coded strings in the application. Based on manual analysis of the code, it is found that about 20,000 hard-coded strings are part of the debug log messages which need not be internationalized (externalized). That number should be deducted from the total detected by the tool. So we end up with 30,000 hard-coded strings. Further analysis reveals that out of these 30,000 hard-coded strings, around 10,000 are part of macros and do not need to be externalized. So we are left with 20,000 hard-coded strings which probably need to be externalized. In this example exercise context, it is concluded that around 40% of the detected strings need to be externalized. This number can still be reduced as more detailed code inspection is done, but for the purpose of estimation it gives a fair level of accuracy.

Sometimes if manual code inspection is not possible, the sampling percentage can be taken by analyzing samples of the code taken from the entire source code. One can come up with some statistics based on the sample files analyzed. The accuracy of this statistic depends on how well the sample is chosen. The sample files taken must contain enough internationalization impact areas in order to be a representative sample. The estimation model defines the following approach for such cases:

Sampling Approach:

The internationalization code analysis tool can be executed on the entire code base (C/C++/Java, or the like). This will give an overall statistic regarding the internationalization readiness of the application and give a breakup of the modules and files impacted most.

Files containing the source code with candidate internationalization impact points can be selected from each of the components/modules present in the application for sampling.

A combination of Systematic and Stratified sampling can be used to take the sample. The discussion of sampling herein provides more details.

The sample files can be analyzed manually to determine the actual number of internationalization impact points in those files. Taking into account the total number of impacted files, that data can then be extrapolated to obtain a percentage of actual impact points out of the numbers reported by the internationalization analysis tool.

Accurate sampling depends on the quality of sample files chosen. More details on the data sampling approach are described herein.

Estimation

SIEM can be based on quantitative and qualitative inputs to derive the effort estimation. Typical mature organizations keep a record of staff productivity figures for various programming languages (e.g., in terms of SLOC per day, function points per day, or the like). Apart from this, industry data on such productivity figures is also available. Taking the historical data, it is possible to estimate for internationalization changes if what kind of changes are expected to be done in the code are known.

Unlike regular maintenance projects, where the specific changes to the code cannot be estimated initially, when we analyze the code for internationalization changes, we know specifically what code needs to be changed; from experience of internationalization projects executed in the past, one knows approximately how many lines of code will be taken to complete the change. Internationalization changes mainly involve externalizing hard-coded strings and replacing non-Unicode functions and data types with their Unicode equivalent. This can be a simple but laborious activity as the number of hard-coded strings and non-Unicode may be in thousands. If the specific number of such occurrences can be counted, one can use this information along with the productivity figures for the particular language and come to a reasonable estimate to make the changes.

The SIEM template can use the following information to be provided in order to calculate the effort, Total count of hard-coded strings (e.g., the number of hard-coded strings which probably require to be externalized to a resource file or message catalog).

Total count of non-Unicode API's. These are API's and functions which work only with ASCII data. They may not be able to support Unicode data or operations.

Count of date/time, number, currency, address, and postal code fields etc. This information is required when region specific support has to be provided for the application. Regions have their own rules for date/time, number, currency formatting etc.

Impact points related to java script and AJAX code—Java script code may contain hard-coded strings or non-Unicode function calls.

Count of static and dynamic UI elements—Static UI elements like labels typically need to be externalized, while dynamic UI elements like combo boxes and tree controls need to be designed to support Unicode characters.

Count and type of reports—The tool may be interfacing with external reporting applications or generating its own reports. Reports need to be internationalized to support Unicode data.

Count of database columns/tables which have non-Unicode types—Database tables and columns need to support Unicode data.

List of 3rd party tools and applications in use—$3^{rd}$ party applications and interfaces need to be analyzed to check if they support Unicode data. Either the 3$^{rd}$ party applications need to be upgraded or wrappers may be needed to interface with them.

Build and installer changes—Build scripts or installer changes might be needed after the application is made available for multiple languages.

Other impacted areas like CSS, HTML, Sorting, etc.

Images containing text or region specific information—Images containing text need be identified. Such images need to be recreated for respective supported languages or regions.

Most of the above inputs are quantitative in nature and can be obtained using static analysis tools. An internationalization analyzer tool can be used to get most of the above inputs. Apart from this, there may be other inputs which are application specific (e.g., creation of internationalization wrapper library, creation of special UI elements, data migration, etc.). In order to estimate the internationalization impact for such requirements, one can rely on past experiences with making similar changes in products with related technologies and programming languages. These estimation figures are qualitative in nature and may vary depending on the product, team dynamics, programming language, platform, etc.

For all the quantitative data put into the SIEM template, the effort can be calculated by taking into consideration the productivity figures of the organization (historical data) and the SLOC to implement one unit of the internationalization impact point. More details on the effort modeling approach are described herein.

For the qualitative inputs, the estimation model relies on estimation by analogy to arrive at an approximate effort. The approach generally followed is as follows:

Mature organizations maintain a record of the previous projects executed in the same space. From that historical data, get the size and effort of similar previous projects in the same technology and domain.

Compare the size of the new project with the previous one.

Based on the size of the old project, the size of the new project can be calculated as a percentage.

Based on this percentage, calculate the effort for the new project as compared to the previous project.

Like most projects, an internationalization project can have the different life cycle phases (e.g., analysis, design, build, testing, etc.). The estimation model can take into account such SDLC phases, project management, configuration management, and other miscellaneous activities in order to calculate the overall effort. The effort distribution as per process capability baseline can be used as the basis for overall effort calculation.

EXAMPLE 27

Exemplary Additional Details for Data Sampling

Sampling can be done as part of data collection. Sampling can include a statistical way of analyzing the subset of a large population in order to make some conclusions about the entire population itself. The techniques can include a selection of a good sample which is representative of the whole population in terms of its characteristics. The approach can be applied during internationalization analysis to do an effort estimate for internationalizing the entire source code by analyzing a few sample source files which are impacted by internationalization changes.

Sampling

Internationalization analysis of an existing application/product can involve analyzing the source code to check the current level of internationalization and detect gaps that need to be addressed in order to make the code fully internationalized. Some of the major internationalization impact areas (e.g., candidate internationalization impact points) in the code are as follows:

Hard-coded Strings

These are string literals that are hard-coded into the code itself. They are present as part of user visible alerts, log messages, static UI labels etc. Any change in the strings can lead to a recompilation of the source code.

For the code to be internationalized, hard-coded strings (e.g., at least those which are user visible) need to be externalized (e.g., to a properties or resource file).

Non-Unicode APIs

These are APIs and functions that only support single byte data (ANSI, ASCII). A majority of such APIs (e.g., strcmp, strcpy, etc.) work on single bytes only and are not able to handle Unicode data.

For the code to be internationalized, non-Unicode APIs and functions need to be replaced with their Unicode equivalent APIs. (e.g., wcscmp, wcscpy etc.). Not all non-Unicode APIs need to be replaced. It also depends on the target encoding to be supported. (e.g., strcpy may work for UTF8 but needs to be replaced with wcscpy for UTF16.)

Non-Unicode Data-Types

These are data types which typically handle only single byte data (e.g. char, string etc.).

For the code to be internationalized, non-Unicode data-types need to be replaced with their Unicode equivalent data-types (e.g. wchar_t, wstring, etc.). Not all non-Unicode data-types need to be replaced. It also depends on the data being processed. If it is known that the data for a particular module will not be Unicode, those data-types need not be replaced.

Date/Time Fields

When an application has to be supported in multiple regions, the application should be able to display date and time values in the users' local format.

Accordingly the impact of time zone can be taken into account for date/time fields by using the appropriate date/time formatting functions.

Number Formatting

Different regions have different formats of representing numbers. The symbols used for decimals and thousand separator can vary.

For the code to be internationalized, the application needs to be able to set the number format as per the locale in which it is running.

Typically most non-internationalized applications have to address the above impacted areas along with many others in order to attain some level of internationalization. As part of effort estimation for internationalization requirements, one can start with analyzing the source code in order to collect raw data regarding the internationalization impact areas. This can include manual review of the code, which may be a very time consuming activity if the source code is large. The code analysis can be expedited by the use of internationalization analysis tools. The output of such a tool can be a report that lists the instances of hard-coded strings, non-Unicode APIs and data-types, date formatting, number formatting, etc., apart from other impact points.

During internationalization analysis exercises, it was discovered that hard-coded strings and non-Unicode APIs/data-types form the bulk of impacted areas in the code. Past experience also indicates that not all instances of hard-coded strings or non-Unicode APIs/data-types need to be changed in order to internationalize the code. For any medium to large application, their numbers are in thousands, and it is virtually impossible to analyze each hard-coded string or API to check if they really need to be changed in the internationalization context. Consequently, the effort estimation for internationalization changes becomes difficult since the volume of impacted areas to be analyzed is huge. For such scenarios, a data sampling approach can be taken to come up with an effort estimate based on a sample of the impacted code. The sample chosen can be a good representative of the entire source code in order to get a good estimate.

Sampling Process

As part of internationalization analysis the following steps can be followed while sampling internationalization data:

Internationalization analysis of code
Identifying the sampling source
Selecting the sampling frame
Selecting the sampling method
Calculating the sample size
Sampling the data
Deriving conclusions
Generating the Internationalization Analysis Reports An Analyzer tool can be run on the entire source code to generate the following reports:

Instances of Hard-Coded Strings in the Code

This gives a list of files containing hard-coded strings along with the count of hard-coded strings in each file. The list can be sorted by the number of hard-coded strings in the files.

Instances of Non-Unicode APIs in the Code

This gives a list of files containing non-Unicode APIs along with the count of non-Unicode APIs in each file. The list can be sorted by the number of non-Unicode APIs in the files.

Instances of Non-Unicode Data-Types in the Code

This gives a list of files containing non-Unicode data-types along with the count of non-Unicode data-types in each file. The list can be sorted by the number of non-Unicode data-types in the files.

One can run the internationalization analysis tool to get a report which gives the following data:

Number of files which contain internationalization impact points

Ordered list of files based on the number of internationalization impact points in the files.

TABLE

Impact Points

| Sr. No. | File name | Count of internationalization impact points |
|---|---|---|
| 1 | CDialog1.cpp | 1035 |
| 2 | CDialog2.cpp | 960 |
| ... | | |
| 1500 | CReportTemplate.cpp | 43 |
| ... | | |
| 2000 | CTaskList.cpp | 2 |

The report can order the files based on the number of impact points in the files.

The impact points under consideration are hard-coded strings and non-Unicode APIs/data-types since they form the bulk of impact points for analysis. However, analysis can be done on other impact points too (e.g., if they are in very large numbers).

Ordered list of files based on each specific impact point (e.g. ordered list of files based on the occurrences of hard-coded strings, non-Unicode APIs/data-types) as shown below.

TABLE

Impact Points (hard-coded strings)

| Sr. No. | File name | Count of hard-coded strings |
|---|---|---|
| 1 | CDialog2.cpp | 560 |
| 2 | CDialog1.cpp | 340 |
| ... | | |
| 1500 | CReportList.cpp | 20 |
| ... | | |
| 2000 | CTaskList.cpp | 0 |

TABLE

Impact Points (non-Unicode APIs)

| Sr. No. | File name | Count of non-Unicode APIs |
|---|---|---|
| 1 | CDialog1.cpp | 444 |
| 2 | CDialog2.cpp | 230 |
| ... | | |
| 1000 | CReportTemplate.cpp | 12 |
| ... | | |
| 1500 | CTaskList.cpp | 1 |

TABLE

Impact Points (non-Unicode data types)

| Sr. No. | File name | Count of non-Unicode data types |
|---|---|---|
| 1 | CDialog3.cpp | 546 |
| 2 | CDialog4.cpp | 233 |
| ... | | |
| 1300 | CTaskManager | 23 |
| ... | | |
| 1700 | CDialogManager.cpp | 0 |

Identifying the Sampling Source

Sampling can start with identifying the sampling source. One can identify the source from which the sample will be drawn. A preliminary analysis of the source code structure along with the internationalization analysis report generated by the internationalization analysis tool can help in the selection. Looking at the density of internationalization impact points (number of impact points per file) throughout the code, the samples can be taken from some particular modules, folders etc.

For the internationalization analysis, the entire source code can be considered as the sampling source.

Selecting the Sampling Frame

The sampling frame can be the list of all elements in the population of interest. The sampling frame can define the target population from which the sample is drawn and to which the sample data will be generalized.

For the internationalization analysis, the sampling frame will be the files in the source code which contain the internationalization impact points as indicated by the internationalization analyzer tool.

Selecting the Sampling Method

Picking a quality sample can be supported. The sample selected should contain the right mix of internationalization impact points so as to form a representative of the entire source code.

There are a number of sampling methods that can be used such as simple random sampling (SRS), Systematic sampling, Stratified sampling, Cluster sampling, etc. Different methods have their own advantages and disadvantages. One can select the method that works best in the internationalization analysis exercise. For the internationalization sampling exercise a mix of systematic sampling and stratified sampling techniques can be used.

As per the stratified sampling method, each individual report obtained above can be considered as a separate population (stratum) for the sampling exercise. Segregating the entire population may be an expensive and time consuming exercise, but the internationalization analysis tool can allow automation and can provide reports that are in the needed format for data sampling.

Systematic sampling can then be applied to each stratum. Systematic sampling can ensure that all files in the source code have equal probability of being selected. Because samples are taken from different strata (e.g., hard-coded strings, non-Unicode APIs, non-Unicode data-types, and the like) varying in size, it provides a balance while analyzing the entire source code by taking into account the variance in impact points across the entire source code.

Calculating the Sample Size

Sample size calculation is concerned with how much data needs to be analyzed in order to draw conclusions about the whole population. Determination of an appropriate sample size can be a statistical exercise. If the sample size is too small, it may not yield accurate results, while a large sample size will result in wasting time though it leads to increased precision in estimates.

In the case of internationalization analysis, one might have thousands of internationalization impact points (hard-coded strings, non-Unicode APIs etc.) in the code. Because it is not always feasible to analyze all the impacted source files, one can select a certain number of files from the whole source code from which one can extrapolate the results and draw some conclusions.

There are various statistical formulae which can be used to determine the sample size.

The following factors influence the sample size,
Margin of error (ME)
Confidence level (CL)
Population size (N)

For most statistical calculations, a margin of error of 5% and a confidence level of 95% gives a fairly good level of approximation.

The sample size for a fixed population can be calculated as follows:

$$ss = \frac{0.25 z^2}{ME^2}$$

For finite populations, $$n = \frac{ss}{1 + (ss - 1)/N}$$

Where, ss=sample size considering the margin of error and confidence level.

n=sample size considering the finite population i.e. number of impacted files to analyze.

ME=the desired margin of error also known as the confidence interval.

N=size of the population i.e. total number of impacted files for the particular impact area.

z=critical standard score. It is the value for which the cumulative probability is 'P'

$$P=1-\alpha/2 \text{ where } \alpha=1-CL$$

The distribution of standard scores has a Mean of 0 and a standard deviation of 1. Using the standard deviation tables, one can calculate the standard score for the cumulative probability calculated above, mean of 0 and standard deviation of 1. This calculation is based on the standard normal distribution table. For example, for a confidence level of 95%, the cumulative probability is 0.975 for which the z-score from the standard normal distribution table is 1.96.

What this basically means is that if one finds that 15% of the hard-coded strings in the sample are supposed to be externalized (with a precision rate of +/−5%), one can conclude that between 10% and 20% of the hard-coded strings from the total hard-coded strings would have to be externalized. So it gives a range taking into account the margin of error. One can accordingly choose the best/worst case scenarios.

Using the above, a sample size can be obtained, which helps in selecting a sample from the entire source code for the purpose of the analysis.

Sampling the Data

After the reports on the internationalization impact points are obtained from the internationalization analysis tool, the reports can be analyzed in order to determine the sample files that need to be considered for detailed analysis.

Assume the source code has 5000 files. As per the internationalization analysis, 2500 files are found to contain internationalization impact points out of which 2000 files are found to have hard-coded strings, 1500 files are found to have non-Unicode APIs and 1700 files are found to have non-Unicode data-types as shown in the tables herein.

As per the stratified sampling technique, one can divide the population (5000 files) into 3 parts, the files containing the hard-coded strings, the files containing the non-Unicode APIs and the files containing the non-Unicode data-types. These 3 parts will be regarded as our strata.

For each stratum, the sample size can be calculated using the formula given above.

Assume the following sample sizes are obtained,
$n_{HC}$=322 (Sample size for hard-coded strings)
$n_{API}$=306 (Sample size for non-Unicode APIs)
$n_{DT}$=314 (Sample size for non-Unicode data-types)

After the sample size for each stratum is obtained, samples can be taken from each stratum using the systematic sampling method (e.g., depending on the sample size). Files are selected at regular intervals from each stratum.

For example, as per the figures calculated above, systematic sampling will be done based on the following sampling intervals (rounded to the next whole number), Sampling interval for hard-coded strings ($SI_{HC}$)=2000/322=7

Sampling interval for non-Unicode APIs ($SI_{API}$)=1500/306=5

Sampling interval for non-Unicode data-types ($SI_{DT}$)=1700/314=6

Taking the sampling intervals for each stratum, samples will be selected as follows, Hard-coded strings—from the ordered list of files containing hard-coded strings every 7$^{th}$ file will be included in the sample.

Non-Unicode APIs—From the ordered list of files containing non-Unicode APIs, every 5$^{th}$ file will be included in the sample.

Non-Unicode data-types—From the ordered list of files containing non-Unicode data-types, every 6$^{th}$ file will be included in the sample.

After this exercise, a total of 942 sample files will be available for detailed analysis. It is quite possible that some files may contain a mix of hard-coded strings, non-Unicode APIs and non-Unicode data-types. One can safely assume that they would be representative of the entire source code and would contain enough variance to enable one to make extrapolations on the sample.

Deriving Conclusions

The sampled files are representative of the entire source code. These sample files need to be analyzed further to check if the candidate internationalization impact points are in fact required to be fixed in order to internationalize the code (e.g., are true impact points). Detailed analysis of the sample can be done using the analysis tool or by manually scanning the code.

Filtering out internationalization impact points which need not be changed can be based on a number of factors. Some typical scenarios are as follows, Hard-coded strings which are part of debug log messages need not be externalized.

All such occurrences can be ignored.

Hard-coded strings which are used internally by the application and are not user visible can be ignored.

Non-Unicode APIs being used in scenarios where Unicode data is not expected can be ignored.

Non-Unicode data-types being used in scenarios where Unicode data is not expected can be ignored.

For each file analyzed, each impact point in that file can be tagged as impacted or not-impacted. Once the samples have been analyzed, typically the result of the detailed analysis should be as follows:

TABLE

Percentage impact

| Sample type | Total | Require change? (True impact points) | Percentage impact |
|---|---|---|---|
| Hard-coded strings | 22000 | 3300 | 15% |
| Non-Unicode APIs | 15000 | 6000 | 40% |
| Non-Unicode data-types | 18000 | 6400 | 35% |

From this sampling analysis one can conclude that around 15% of the total hard-coded strings need to be externalized, around 40% of non-Unicode APIs need to be replaced with their Unicode equivalents and around 35% of non-Unicode data-types need to be replaced with their Unicode equivalents.

These figures can be used in the Software Internationalization Estimation Model in order to arrive at more accurate estimates.

Further Details

Systematic sampling can arrange the population according to some ordering scheme and then select samples from regular intervals (e.g., starting at some random element, every subsequent nth element is selected in the sample where n=population size/sample size). In practice, the starting element is not the first in the list, but chosen randomly between the first and nth element.

To implement stratified sample, when the population has a number of different categories, the population itself can be divided into a number of different "strata" where each stratum can be sampled as a separate sub-population, out of which elements can be randomly selected; individual estimates per strata can be made and then combined.

Margin of error can also be called the "Confidence interval." It is the amount of error that one can accept in the sampling calculation. The margin of error selected depends on the precision needed to make population estimates from a sample.

For example, while analyzing hard-coded strings in the source code, the margin of error might be + or −3%. This means that if 60% of the hard-coded strings in a sample are to be externalized, one could be confident that, if one analyzed the entire source code, between 57% (60−3) and 63% (60+3) of the hard-coded strings would have to be externalized.

Lower margin of error requires a larger sample size.

Confidence level is the amount of uncertainty that one can accept in the sampling calculation. It is the estimated probability that a population estimate lies within a given margin of error. When one says confidence level is 95% one is saying that 95 out of 100 samples are a good representative of the entire population within the level of precision defined.

For example, a confidence level of 95% indicates that one can be 95% confident that between 57% and 63% of the hard-coded strings have to be externalized.

Higher confidence level requires a larger sample size.

Population size is a measure of the number of elements from which the sample can be chosen. The sample size typically does not change much for populations greater than 20,000.

A table of standard normal distribution can be used for calculating the sample size.

EXAMPLE 28

Exemplary Effort Modeling Approach

An effort modeling approach can be included as part of the Software Internationalization Estimation Model. The approach can be a quantitative way of calculating the internationalization effort for one unit of a particular internationalization impact point (e.g., the effort required to externalize one hard-coded string). The approach can involve assessment of the change needed for a given internationalization feature coupled with the development productivity data to calculate the effort needed for one unit of the given internationalization feature. The approach can provide the internationalization productivity figures or the effort needed for one unit of work. The correctness of overall effort estimation can be supported by the data obtained from sampling, which represents the total number of units of work and/or knowledge regarding the code changes required.

Different software estimation models/techniques can use different models/approaches to define a unit of work and the effort for that unit of work. For example, a work break down model can define units as simple/medium/complex and then assign effort for each unit. A Function Point technique can define one function point as the smallest unit of work and then assign effort to this unit.

A model can be based on quantitative data and can provide more accurate effort estimates. The model can derive the effort needed for a unit work from the Function Point technique and a Process Capability matrix.

Effort Modeling Approach

The approach used for modeling can be as follows:

Identify the effort needed for one Function Point from a Process Capability matrix (PCB). The PCB can contain productivity figures based on different projects of similar type of work and similar technologies that are executed within the organization in the last couple of years.

One function point is then mapped to the lines of code, based on a software language productivity table (e.g., Caper Jones or the like).

Identify the number of lines of code to be changed for a unit of internationalization feature.

The number of lines of code to be changed can be derived from the implementation approach for that feature in the respective programming language. For example, externalizing a hard-coded string might take 2 lines of code in Java and 4 lines of code in C++.

Use the information from the above to calculate the amount of effort needed for one unit of internationalization feature.

Hard-coded Strings

These are string literals that are hard-coded into the code itself. They are present as part of user visible alerts, log messages, static UI labels etc. Any change in the strings can lead to a recompilation of the source code.

For the code to be internationalized, hard-coded strings (e.g., at least those which are user visible) need be externalized to a properties or resource file. The code can then use Resource Bundle APIs to fetch the localized message at runtime.

In a normal scenario, around 3 lines of code change can replace a hard-coded string with a ResourceBundle call in Java. So, externalizing 18 to 19 hard-coded strings would constitute 1 function point in Java.

Non-Unicode APIs

These are APIs and functions that only support ASCII data. A majority of these APIs (e.g., strcmp, strcpy, etc.) work on single bytes and are not able to handle multi-byte data.

For the code to be internationalized, non-Unicode APIs and functions need to be replaced with their Unicode equivalent API (e.g. wcscmp, wcscpy, etc.).

Replacing Non-Unicode compliant API with a Unicode Compliant API varies from programming language to language.

In most of the cases, around 4 or 5 lines of code change can replace a non-Unicode API with a Unicode API in C++, which implies, changing 13 to 15 Non-Unicode APIs to Unicode APIs constitutes one function point in C++.

Date/Time Fields

When an application has to be supported in multiple regions, it is important that the application be able to display date and time values in the local format.

Accordingly the impact of time zone needs to be taken into account for date/time fields by using the appropriate date/time formatting functions.

In a normal scenario, around 3 lines of code can implement locale specific Date/time formatting in Java, which implies 18 to 19 date/time formatting changes would constitute 1 function point in Java.

Number Formatting

Different regions have different formats of representing numbers. The symbols used for decimals and thousand separator can vary.

For the code to be internationalized, the application needs to be able to set the number format as per the locale in which it is running.

In a normal scenario, around 3 lines of code change can implement locale specific number formatting in Java, which implies 18 to 19 number formatting changes would constitute 1 function point in Java.

On similar lines, size of code change for different internationalization features in a given programming language are obtained based on their most appropriate implementation details.

Typically most non-internationalization applications have to address the above impacted areas along with many others in order to attain some level of internationalization. As part of effort modeling based on high level approach, the size of work is determined, which is then used to identify the effort estimate for that requirement.

Individuals or organizations can define their productivity figures. Also, lines of code may differ from implementation to implementation. The above calculations can be done taking these variables into account.

Effort Calculation—ResourceBundle Change in Java

The following demonstrates the exemplary use of an Effort Modeling Approach to calculate the effort for one unit of ResourceBundle change in Java.

Referring to the process capability matrix data for Productivity data, for maintenance projects in a high level language (e.g., Java/C++), the average productivity figure for a major enhancement is 44 FP/PM (Function Point per Person Month).

One can refer to a software language productivity table (e.g., Caper Jones or the like) to map size of code in terms of Lines of Code with Size in terms of FP. So for Java, 1 FP is equivalent to 53 Lines of code.

For 1 simple resource bundle change, on average around 3 lines of code change (addition/modification) is needed.

Above mentioned data is then used to calculate the effort needed for one unit of Resource Bundle change. The table below shows exemplary calculations:

TABLE

Unit Effort Calculation

| | |
|---|---|
| Productivity: (FP/PM) | 40 |
| Productivity (FP/Hr) | 0.227 |
| Line of Code/FP (for Java) | 53 |
| Lines of Code for 1 RB change | 3 |
| Size of 1 RB change in terms of FP | 0.056 |
| Effort for each unit of RB change (hrs) | 0.244 (hrs) |
| Effort for each unit of RB change (Mins) | 14.94 (mins) |

Productivity Figures from Process Capability Matrix ("PCB")

A PCB for maintenance projects with major enhancements is shown below and can be referred to for the productivity figures. The matrix can be based on historical data for an organization or other unit of observation over a particular time period.

TABLE

Maintenance Projects - Major Enhancements

| | | | Capability Baseline | | | |
|---|---|---|---|---|---|---|
| Parameter | Description | Type | Mean | LCL | UCL | Comments |
| Productivity | Function Point/Person | HL | 44.7 | 11.7 | 70 | Approximately 70% of the |
| | | LL | 31 | 11 | 54.6 | |

TABLE-continued

Maintenance Projects - Major Enhancements

Capability Baseline

| Parameter | Description | Type | Mean | LCL | UCL | Comments |
|---|---|---|---|---|---|---|
| | Month | | | | | projects fall in this range |

In function points per person month
HL: High Level Language
LL: Low Level Language
LCL: Lower end of range
UCL: Upper end of range

TABLE

Excerpt from Caper Jones Table

| Language | Level | Average Source Statements per Function Point |
|---|---|---|
| C | 2.50 | 128 |
| C++ | 6.00 | 53 |
| JAVA | 6.00 | 53 |
| Other languages can be supported | | |

EXAMPLE 29

Exemplary Template for Sample Size

FIG. 14 is a screen shot showing an exemplary template 1400 for generating sample size in accordance with the technologies described herein. In the example, the template 1400 is implemented as a Microsoft® Excel® spreadsheet that can support three internationalization impact point types in a stratification scenario, but any number of other implementations are possible. An internationalization analyzer tool is used to analyze files in the example to produce a report for input data, but manual detection can alternatively be used.

The following parameters can be entered to calculate a recommended sample size:

Margin of error—This is also known as the Confidence interval. It is the amount of error that one can accept in the sampling calculation. The margin of error selected depends on the precision needed to make population estimates from a sample. This can generally be taken as 5%.

Confidence Level—Confidence level is the amount of uncertainty that one can accept in the sampling calculation. It is the estimated probability that a population estimate lies within a given margin of error. When one says confidence level is 95% one is saying that 95 out of 100 samples are a good representative of the entire population within the level of precision defined.

This can generally be taken as 95%.

Total files containing hard-coded strings—These are string literals which are hard-coded into the code itself. They are present as part of user visible alerts, log messages, static UI labels etc.

Enter the number of files containing hard-coded strings as per the report generated by an internationalization analyzer tool.

Total files containing non-Unicode APIs—These are APIs and functions which only support single byte data (ANSI, ASCII). Enter the number of files containing non-Unicode APIs as per the report generated by an internationalization analyzer tool.

Total files containing non-Unicode data-types—These are data types which typically handle only single byte data. Enter the number of files containing non-Unicode data-types as per the report generated by an internationalization analyzer tool.

The template can then calculate the sample size. In the interim calculations, a can be calculated as $=1-$(confidence level).

The Cumulative Probability (P) can be calculated as $=1-(\alpha/2)$

The z-score can be obtained from the standard normal distribution table as $=\text{NORMSINV}(P)$.

The sample size for the fixed population (ss) can be calculated as $=(0.25*z^2)/(ME^2)$.

Sample sizes for individual categories can be calculated as $=ss/(1+(ss-1)/[\text{count for category}])$.

The different sample sizes can be used in a stratification scenario as described herein. In practice, additional and/or different strata can be used in the template.

EXAMPLE 30

Exemplary Computing Environment

The techniques and solutions described herein can be performed by software, hardware, or both of a computing environment, such as one or more computing devices. For example, computing devices include server computers, desktop computers, laptop computers, notebook computers, handheld devices, netbooks, tablet devices, mobile devices, PDAs, and other types of computing devices.

Figure 15:
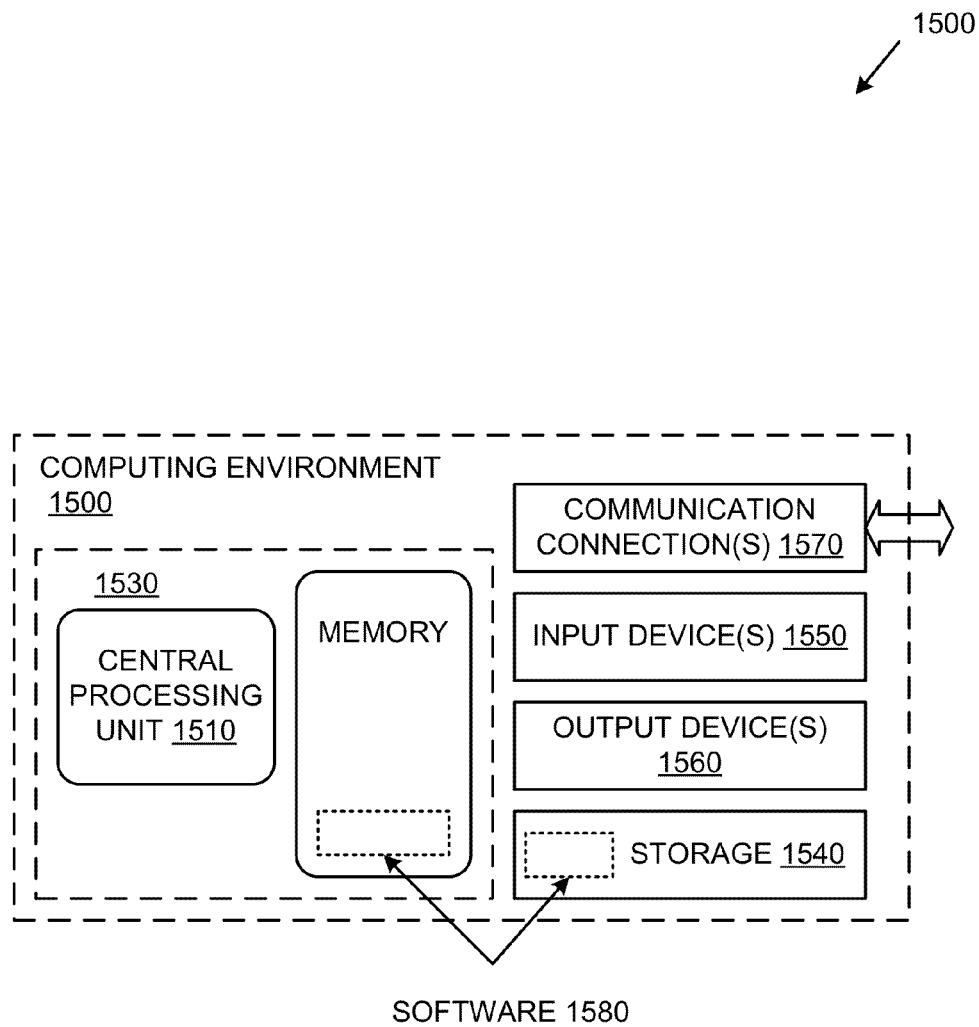
FIG. 15 is a block diagram of an exemplary computing environment suitable for implementing any of the technologies described herein.

FIG. 15 illustrates a generalized example of a suitable computing environment 1500 in which the described technologies can be implemented. The computing environment 1500 is not intended to suggest any limitation as to scope of use or functionality, as the technologies may be implemented in diverse general-purpose or special-purpose computing environments. For example, the disclosed technology may be implemented using a computing device comprising a processing unit, memory, and storage storing computer-executable instructions implementing the enterprise computing platform technologies described herein. The disclosed technology may also be implemented with other computer system configurations, including hand held devices, multiprocessor systems, microprocessor-based or programmable consumer electronics, network PCs, minicomputers, mainframe computers, a collection of client/server systems, and the like. The disclosed technology may also be practiced in distributed computing environments where tasks are performed by remote processing devices that are linked through a communications network. In a distributed computing environment, program modules may be located in both local and remote memory storage devices With reference to FIG. 15, the computing environment 1500 includes at least one processing unit 1510 coupled to memory 1520. In FIG. 15, this basic configuration 1530 is included within a dashed line. The processing unit 1510 executes computer-executable instructions and may be a real or a virtual processor. In a multi-processing system, multiple processing units execute computer-executable instructions to increase processing power. The memory 1520 may be volatile memory (e.g., registers, cache, RAM), non-volatile memory (e.g., ROM, EEPROM, flash memory, etc.), or some combination of the two. The memory 1520 can store software 1580 implementing any of the technologies described herein.

A computing environment may have additional features. For example, the computing environment 1500 includes storage 1540, one or more input devices 1550, one or more output devices 1560, and one or more communication connections 1570. An interconnection mechanism (not shown) such as a bus, controller, or network interconnects the components of the computing environment 1500. Typically, operating system software (not shown) provides an operating environment for other software executing in the computing environment 1500, and coordinates activities of the components of the computing environment 1500.

The storage 1540 may be removable or non-removable, and includes magnetic disks, magnetic tapes or cassettes, CD-ROMs, CD-RWs, DVDs, or any other computer-readable media which can be used to store information and which can be accessed within the computing environment 1500. The storage 1540 can store software 1580 containing instructions for any of the technologies described herein.

The input device(s) 1550 may be a touch input device such as a keyboard, mouse, pen, or trackball, a voice input device, a scanning device, or another device that provides input to the computing environment 1500. For audio, the input device(s) 1550 may be a sound card or similar device that accepts audio input in analog or digital form, or a CD-ROM reader that provides audio samples to the computing environment. The output device(s) 1560 may be a display, printer, speaker, CD-writer, or another device that provides output from the computing environment 1500.

The communication connection(s) 1570 enable communication over a communication mechanism to another computing entity. The communication mechanism conveys information such as computer-executable instructions, audio/video or other information, or other data. By way of example, and not limitation, communication mechanisms include wired or wireless techniques implemented with an electrical, optical, RF, infrared, acoustic, or other carrier.

The techniques herein can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

Non-Transitory Computer-Readable Media

Any of the computer-readable media herein can be non-transitory (e.g., memory, magnetic storage, optical storage, or the like).

Storing in Computer-Readable Media

Any of the storing actions described herein can be implemented by storing in one or more computer-readable media (e.g., computer-readable storage media or other tangible media).

Any of the things described as stored can be stored in one or more computer-readable media (e.g., computer-readable storage media or other tangible media).

Methods in Computer-Readable Media

Any of the methods described herein can be implemented by computer-executable instructions in (e.g., encoded on) one or more computer-readable media (e.g., computer-readable storage media or other tangible media). Such instructions can cause a computer to perform the method. The technologies described herein can be implemented in a variety of programming languages.

Methods in Computer-Readable Storage Devices

Any of the methods described herein can be implemented by computer-executable instructions stored in one or more computer-readable storage devices (e.g., memory, magnetic storage, optical storage, or the like). Such instructions can cause a computer to perform the method.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

We claim:

1. A non-transitory, tangible computer-readable storage device comprising computer-executable instructions stored therein for performing a method for estimating programming effort for internationalizing a software program, the method comprising:

for a software program comprising an overall plurality of program files, identifying for the plurality of program files, an overall number of candidate internationalization impact points for subsequent internationalization;

for the software program, applying a sampling technique to the program files, wherein applying the sampling technique comprises selecting a subset of the program files;

for the subset of the program files selected using the sampling technique, identifying a number of candidate internationalization impact points of the subset for subsequent internationalization, wherein:

at least a first portion of the candidate internationalization impact points are associated with at least a first condition within at least one of the plurality of program files;

at least a second portion of the candidate internationalization impact points are associated with at least a second condition within at least one of the plurality of program files, wherein the first condition is different from the second condition, and the first and second condition are selected from a plurality of conditions indicating a particular functionality performed by the software program; and subsequent internationalizing of the software program is based at least in part on remediating the at least first condition and leaving the at least second condition unremediated;

identifying within a subset of the candidate internationalization impact points, a number of the candidate internationalization impact points as true internationalization impact points for subsequent internationalization; and extrapolating an amount of programming effort used to subsequently internationalize the software program, the extrapolating based at least on the number of identified true internationalization impact points, the number of candidate internationalization impact points of the subset, and the overall number of candidate internationalization impact points.

2. The non-transitory, tangible computer-readable storage device of claim 1, wherein applying the sampling technique comprises:
   counting a number of program files from the plurality of program files containing at least one candidate internationalization impact point;
   determining a sample size based on the number of program files containing at least one candidate internationalization impact point, a confidence interval, and a confidence level; and
   based on the sample size, selecting the subset of the program files from the program files containing at least one candidate internationalization impact point.

3. The non-transitory, tangible computer-readable storage device of claim 2, wherein:
   selecting the subset of the program files comprises systematic sampling.

4. The non-transitory, tangible computer-readable storage device of claim 1, wherein applying the sampling technique comprises:
   for a plurality of different internationalization impact point types, placing the program files into strata according to internationalization impact point type;
   counting a respective number of program files having candidate internationalization impact points of the internationalization impact point types; and
   performing sampling separately for the strata.

5. The non-transitory, tangible computer-readable storage device of claim 4, wherein applying the sampling technique comprises:
   calculating different sample sizes for the different internationalization impact point types.

6. The non-transitory, tangible computer-readable storage device of claim 1, wherein the method further comprises:
   detecting which of the program files have no candidate internationalization impact points of a particular candidate internationalization impact point type; and
   responsive to the detecting, omitting the program files with no candidate internationalization impact points of a particular candidate internationalization impact point type from estimation calculations for the particular candidate internationalization impact point type.

7. The non-transitory, tangible computer-readable storage device of claim 1, wherein:
   identifying a number of candidate internationalization impact points comprises identifying hard-coded strings as candidate internationalization impact points.

8. The non-transitory, tangible computer-readable storage device of claim 7, wherein:
   identifying a number of the candidate internationalization impact points that are true internationalization impact points comprises identifying which of the hard-coded strings need be externalized to achieve internationalization.

9. The non-transitory, tangible computer-readable storage device of claim 7, wherein:
   identifying a number of the candidate internationalization impact points that are true internationalization impact points comprises identifying which of the hard-coded strings are visible to users of the software program.

10. The non-transitory, tangible computer-readable storage device of claim 7, wherein:
    identifying a number of the candidate internationalization impact points that are true internationalization impact points comprises identifying which of the hard-coded strings are part of debug log messages.

11. The non-transitory, tangible computer-readable storage device of claim 1, wherein:
    identifying a number of candidate internationalization impact points comprises identifying invocations of non-Unicode application programing interfaces as candidate internationalization impact points.

12. The non-transitory, tangible computer-readable storage device of claim 1, wherein:
    identifying a number of candidate internationalization impact points comprises identifying usages of non-Unicode data types as candidate internationalization impact points.

13. The non-transitory, tangible computer-readable storage device of claim 1, wherein extrapolating the amount of programming effort to internationalize the software program comprises:
    extrapolating an estimated number of true internationalization impact points for the overall plurality of program files.

14. The non-transitory, tangible computer-readable storage device of claim 13, wherein extrapolating the amount of programming effort to internationalize the software program further comprises:
    based on the estimated number of true internationalization impact points for the overall plurality of program files and historical data indicating programmer productivity, calculating an estimated amount of worker hours to internationalize the software program.

15. The non-transitory, tangible computer-readable storage device of claim 13, wherein extrapolating the estimated number of true internationalization impact points for the overall plurality of program files comprises:
    applying an observed percentage of true internationalization impact points for the subset of program files to a number of candidate internationalization impact points in other program files out of the overall plurality of program files.

16. The non-transitory, tangible computer-readable storage device of claim 13, wherein extrapolating the estimated number of true internationalization impact points for the overall plurality of program files comprises:
    ignoring at least one program file out of the plurality of program files that has no candidate internationalization impact points.

17. A software internationalization estimation tool encoded on a non-transitory, tangible computer-readable storage device and comprising:
    for a software program comprising a plurality of overall program files, a sampling tool configured to receive a count of the overall program files having one or more candidate internationalization impact points and calculate, based on a confidence interval and a confidence level, a sample size indicating size of a subset of the overall program files to be taken from the program files, the calculating of the sample size based on the received count of the overall program files having the one or more candidate internationalization impact points; and
    an extrapolation tool configured to receive a number of candidate impact points for the subset of the overall program files, a number of true impact points for the subset, and a number of candidate impact points for the overall program files having candidate internationalization impact points and calculate, based at least on historical programming efficiency data, the number of candidate impact points for the overall program files, and the number of true impact points for the subset, an estimated number of hours to complete internationalization of the software program, wherein:
- at least a first portion of the candidate internationalization impact points are associated with at least a first condition within at least one of the plurality of overall program files;
- at least a second portion of the candidate internationalization impact points are associated with at least a second condition within at least one of the plurality of program files; and
- internationalizing the software program is based at least in part on remediating the at least first condition and leaving the at least second condition unremediated.

18. The software internationalization estimation tool of claim 17, wherein:
the sampling tool supports stratification of the program files based on internationalization impact point type.

19. The software internationalization estimation tool of claim 18, wherein the sampling tool supports the following internationalization impact point types:
- hard-coded strings;
- non-Unicode application programming interfaces; and
- non-Unicode data types.

20. A computer system, comprising:
a processor; and
memory storing computer-executable instructions causing the computer system to perform operations for estimating programming effort for internationalizing a software program, the operations comprising:
- analyzing an overall plurality of program files forming a software program, the analyzing comprising identifying respective numbers of candidate internationalization impact points of different internationalization impact point types comprising hard-coded strings, non-Unicode APIs, and non-Unicode data types;
- applying a stratified sampling technique to the overall plurality of program files, wherein applying the stratified sampling technique to the overall plurality of program files comprises selecting a plurality of respective subsets of the overall plurality of program files, the selecting of the plurality of subsets based on the different internationalization impact point types;
- for each of the plurality of subsets of the overall plurality of program files:
  - identifying respective numbers of the candidate internationalization impact points that are true internationalization impact points; and
  - from the respective numbers of the candidate internationalization impact points that are true internationalization impact points, extrapolating an overall amount of effort to internationalize the software program based at least in part on productivity data and the number of true internationalization impact points, wherein:
    - at least a first portion of the candidate internationalization impact points are associated with at least a first condition within at least one of the plurality of overall program files;
    - at least a second portion of the candidate internationalization impact points are associated with at least a second condition within at least one of the plurality of program files; and
    - internationalizing the software program is based at least in part on remediating the at least first condition and leaving the at least second condition unremediated, wherein the first condition is different from the second condition, and the first and second condition are associated with a particular functionality performed by the software program.

21. The computer system of claim 20, wherein the particular functionality comprises one or more of displaying a text to a user, writing information to a log file, or internal program use.

* * * * *